(12) United States Patent
Sabella et al.

(10) Patent No.: US 11,924,109 B2
(45) Date of Patent: Mar. 5, 2024

(54) EDGE COMPUTING SERVICE PROVISION BASED ON LOCAL COST MEASUREMENTS

(71) Applicant: Intel Corporation, Santa Clara, CA (US)

(72) Inventors: Dario Sabella, Munich (DE); Kilian Peter Anton Roth, Munich (DE)

(73) Assignee: Intel Corporation, Santa Clara, CA (US)

( * ) Notice: Subject to any disclaimer, the term of this patent is extended or adjusted under 35 U.S.C. 154(b) by 287 days.

(21) Appl. No.: 17/464,437

(22) Filed: Sep. 1, 2021

(65) Prior Publication Data

US 2022/0166723 A1 May 26, 2022

Related U.S. Application Data

(63) Continuation of application No. 16/792,503, filed on Feb. 17, 2020, now Pat. No. 11,115,336, which is a (Continued)

(51) Int. Cl.
*H04W 4/24* (2018.01)
*H04L 12/14* (2006.01)
(Continued)

(52) U.S. Cl.
CPC .......... *H04L 47/18* (2013.01); *H04L 12/1407* (2013.01); *H04L 47/822* (2013.01);
(Continued)

(58) Field of Classification Search
CPC . H04L 12/14–1496; H04L 47/10–6295; H04L 47/80–808; H04L 47/824;
(Continued)

(56) References Cited

U.S. PATENT DOCUMENTS

| 6,810,411 B1 | 10/2004 | Coughlin et al. |
| 10,110,495 B1 | 10/2018 | Sabella et al. |

(Continued)

FOREIGN PATENT DOCUMENTS

| WO | 2017091960 | 6/2017 |
| WO | 2017129742 | 8/2017 |

OTHER PUBLICATIONS

"Mobile Edge Computing (MEC); Framework and Reference Architecture", ETSI GS MEC 003 V1.1.1 (Mar. 2016), (2016), 18 pgs.

(Continued)

*Primary Examiner* — Ronald Eisner
(74) *Attorney, Agent, or Firm* — Schwegman Lundberg & Woessner, P.A.

(57) ABSTRACT

Embodiments herein may include systems, apparatuses, methods, and computer-readable media, for a multi-access edge computing (MEC) system. An apparatus for MEC may include a communication interface, a local cost measurements module, and a service allocation module. The communication interface may receive, from a UE, a request for a service to be provided to the UE. The local cost measurements module may collect a set of local cost measurements for the service. The service allocation module may determine to allocate the service to a MEC host based on an allocation policy related to a cost for the MEC host to provide the service or a cost for a service provider to provide the service in view of the one or more local cost measurements. Other embodiments may be described and/or claimed.

16 Claims, 12 Drawing Sheets

Related U.S. Application Data continuation of application No. 16/150,121, filed on Oct. 2, 2018, now Pat. No. 10,567,291, which is a continuation of application No. 15/870,742, filed on Jan. 12, 2018, now Pat. No. 10,110,495.

(60) Provisional application No. 62/589,974, filed on Nov. 22, 2017.

(51) Int. Cl.
    *H04L 47/10*     (2022.01)
    *H04L 47/70*     (2022.01)
    *H04M 15/00*     (2006.01)
    *H04W 92/18*     (2009.01)
    *H04L 65/80*     (2022.01)

(52) U.S. Cl.
CPC .......... *H04L 47/824* (2013.01); *H04M 15/66* (2013.01); *H04M 15/8033* (2013.01); *H04M 15/8044* (2013.01); *H04M 15/8083* (2013.01); *H04M 15/93* (2013.01); *H04W 4/24* (2013.01); *H04W 92/18* (2013.01); *H04L 65/80* (2013.01)

(58) Field of Classification Search
CPC ... H04L 65/80; H04M 15/00–93; H04W 4/24; H04W 4/50; H04W 8/18; H04W 48/18; H04W 52/26–267; H04W 72/00–02; H04W 92/18
See application file for complete search history.

(56) References Cited

U.S. PATENT DOCUMENTS

| | | | |
|---|---|---|---|
| 10,567,291 | B2 | 2/2020 | Sabella et al. |
| 11,115,336 | B2 | 9/2021 | Sabella et al. |
| 2005/0213525 | A1 | 9/2005 | Grayson et al. |
| 2007/0174490 | A1 | 7/2007 | Choi et al. |
| 2007/0183402 | A1 | 8/2007 | Bennett et al. |
| 2012/0064908 | A1 | 3/2012 | Fox et al. |
| 2015/0029854 | A1 | 1/2015 | Starsinic et al. |
| 2015/0215128 | A1 | 7/2015 | Pal |
| 2015/0245160 | A1* | 8/2015 | Agrawal ............... H04L 41/145 455/406 |
| 2016/0142554 | A1 | 5/2016 | Anand |
| 2018/0005254 | A1 | 1/2018 | Bai et al. |
| 2019/0089780 | A1 | 3/2019 | Yousaf et al. |
| 2019/0245789 | A1 | 8/2019 | Sabella et al. |
| 2020/0296045 | A1 | 9/2020 | Sabella et al. |

OTHER PUBLICATIONS

"U.S. Appl. No. 15/870,742, Notice of Allowance dated Jun. 22, 2018", 26 pgs.
"U.S. Appl. No. 15/870,742,312 Amendment filed Aug. 1, 2018", 6 pgs.
"U.S. Appl. No. 15/870,742, PTO Response to Rule 312 Communication dated Aug. 10, 2018", 2 pgs.
"Mobile Edge Computing (MEC); Radio Network Information API", ETSI GS MEC 012 V1.1.1, (Jul. 2017), 57 pgs.
"Mobile Edge Computing (MEC) Terminology", ETSI GS MEC 001 V1.1.1, (2016), 7 pgs.
"Mobile Edge Computing (MEC); Technical Requirements", ETSI GS MEC 002 V1.1.1, (2016), 40 pgs.
"Mobile Edge Computing (MEC); General principles for Mobile Edge Service APIs", ETSI GS MEC 009 V1.1.1, (2017), 55 pgs.
"Mobile Edge Computing (MEC); Mobile Edge Management; Part 2: Application lifecycle, rules and requirements management", ETSI GS MEC 010-2 V1.1.1, (2017), 48 pgs.
"Mobile Edge Computing (MEC); Mobile Edge Platform Application Enablement", ETSI GS MEC 011 V1.1.1, (2017), 55 pgs.
"Mobile Edge Computing (MEC); Location API", ETSI GS MEC 013 V1.1.1, (2017), 24 pgs.
"U.S. Appl. No. 16/150,121, Preliminary Amendment filed Apr. 24, 2019", 7 pgs.
"U.S. Appl. No. 16/150,121, Preliminary Amendment filed May 23, 2019", 10 pgs.
"U.S. Appl. No. 16/150,121, Notice of Allowance dated Oct. 9, 2019", 22 pgs.
"U.S. Appl. No. 16/792,503, Non Final Office Action dated Jun. 23, 2020", 30 pgs.
"U.S. Appl. No. 16/792,503, Response filed Oct. 8, 2020 to Non Final Office Action dated Jun. 23, 2020", 9 pgs.
"U.S. Appl. No. 16/792,503, Final Office Action dated Nov. 27, 2020", 59 pgs.
"U.S. Appl. No. 16/792,503, Examiner Interview Summary dated Dec. 4, 2020", 2 pgs.
"U.S. Appl. No. 16/792,503, Response filed Jan. 19, 2021 to Final Office Action dated Nov. 27, 2020", 11 pgs.
"U.S. Appl. No. 16/792,503, Notice of Allowance dated Apr. 30, 2021", 17 pgs.
Alberto, Ceselli, "Optimized Assignment Patterns in Mobile Edge Cloud Networks", (Jun. 15, 2017), 25 pgs.
Fioccola, G, "Alternate Marking Extension to Active Measurement Protocol draft-fioccola-ippm-alt-mark-active-01", https: tools.ietf.org html draft-fioccola-ippm-alt-mark-active-01, (Mar. 2017), 13 pgs.
Frost, D, "Packet Loss and Delay Measurement for MPLS Networks", RFC 6374, DOI 10.17487 RFC6374, (Sep. 2011), 52 pgs.
Hedayat, K, "A Two-Way Active Measurement Protocol (TWAMP)", RFC 5357, DOI 10.17487 RFC5357, (Oct. 2008), 26 pgs.
Krittin, Intharawijitr, "Simulation Study of Low Latency Network Architecture Using Mobile Edge Computing", IEICE TRANS, INF and SYST., vol. E100=D, No. 5, (May 2017), 10 pgs.
Nokia, Bell Labs, "Multi-access Edge Computing (MEC) Applications", (Mar. 29, 2017), 18 pgs.
Patel, Milan, "Mobile-Edge Computing Introductory Technical White Paper", Issue 1, (Sep. 2014), 36 pgs.
Sabella, D, "A Hierarchical MEC Architecture: Experimenting the Raven Use-Case", 2018 IEEE 87th Vehicular Technology Conference (VTC Spring), (Jun. 2018), 5 pgs.
Seung, Woo Koo, "Wireless Networks for Mobile Edge Computing: Spatial Modeling and Latency Analysis", (Sep. 2017), 33 pgs.
Shalunov, S, "A One-way Active Measurement Protocol (OWAMP)", RFC 4656, DOI 10.17487 RFC4656, (Sep. 2006), 56 pgs.

* cited by examiner

EDGE COMPUTING SERVICE PROVISION BASED ON LOCAL COST MEASUREMENTS

RELATED APPLICATIONS

The present application is a continuation of U.S. application Ser. No. 16/792,503, filed Feb. 17, 2020, which is a continuation of U.S. application Ser. No. 16/150,121, filed Oct. 2, 2018, now issued as U.S. Pat. No. 10,567,291, which is a continuation of U.S. application Ser. No. 15/870,742, filed Jan. 12, 2018, now issued as U.S. Pat. No. 10,110,495, which claims priority to U.S. Provisional Application No. 62/589,974 filed on Nov. 22, 2017, the contents of which are hereby incorporated by reference in their entireties.

FIELD

Various embodiments generally may relate to the field of computing, and in particular, may relate to multi-access edge computing (MEC) systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Multi-access edge computing (MEC), also referred to as mobile edge computing, may offer application developers and content providers cloud-computing capabilities and an information technology service environment at the edge of a network. MEC technology may have some advantages when compared to traditional centralized could computing environments. For example, MEC technology may provide a service to a user equipment (UE) with a lower latency, a lower cost, a higher bandwidth, a closer proximity, or an exposure to real-time radio network and context information. However, the amount of improvements to a service for a UE offered by MEC technology may vary depend on the location of a service provider providing the service to the UE.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
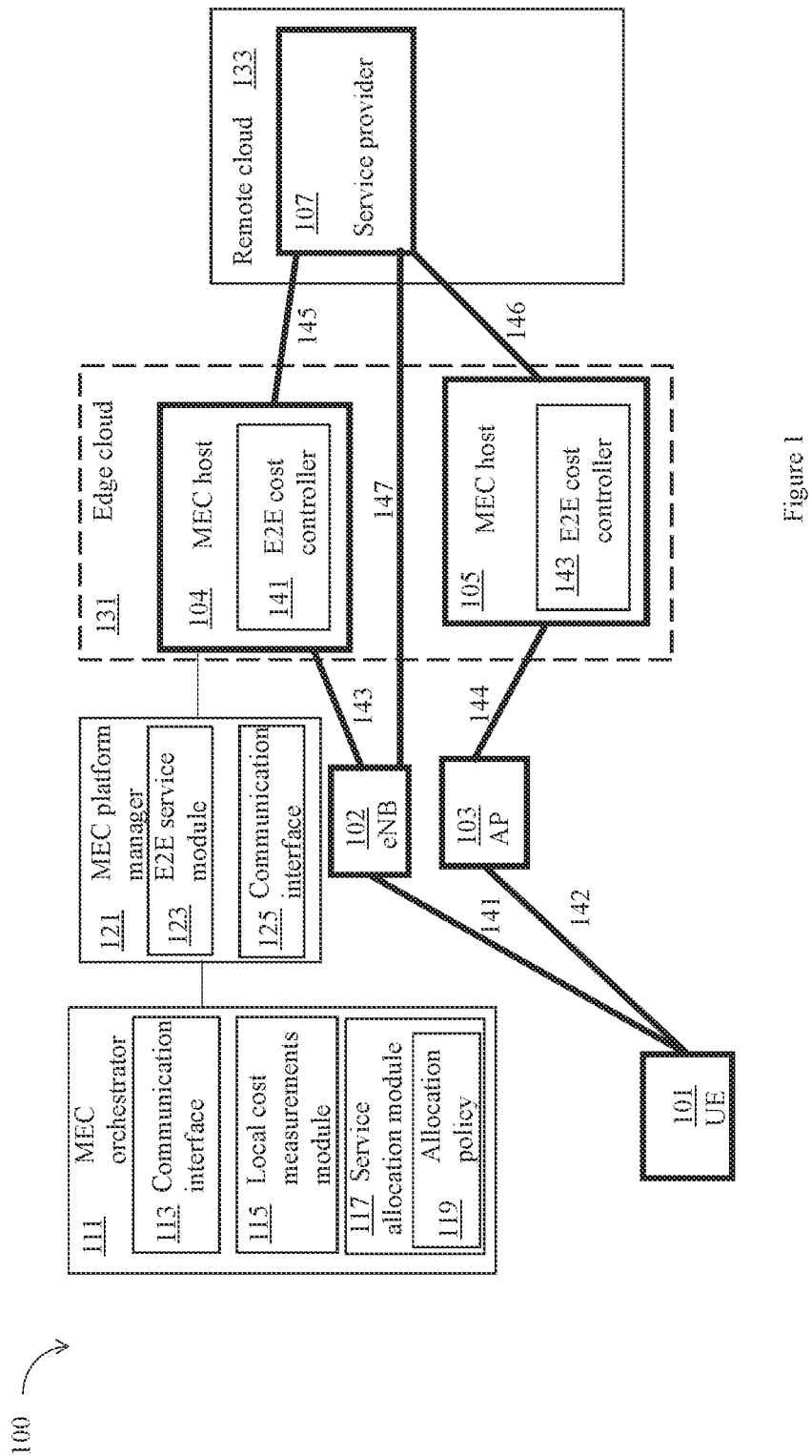
FIG. 1 illustrates an example multi-access edge computing (MEC) system including a MEC orchestrator and a MEC platform manager to allocate a service provider to provide a service to a user equipment (UE) based on a set of local cost measurements for the service, in accordance with various embodiments.

When compared to traditional centralized could computing environments, multi-access edge computing (MEC) technology may provide a service to a user equipment (UE) with many potential advantages. However, the amount of improvements to a service for a UE offered by MEC technology may depend on the location of a service provider providing the service to the UE. Improvements to a service may be measured by various metrics. For example, in some embodiments, improvements to a service may be measured by round trip time (RTT) latency. In some other embodiments, improvements to a service may be measured by financial cost, quality of services (QoS), or a metric defined by a service provider or a user.

A MEC system may include a MEC orchestrator, and a MEC platform manager, which manage the provision of a service to a UE by a service provider, through one or more access points, or one or more MEC hosts. Embodiments herein may include an MEC apparatus that may collect one or more local cost measurements to measure a local cost from a first entity to a second entity along a path from a service provider to the UE to provide the service to the UE. A local cost measurement from a first entity to a second entity may represent a latency, a financial cost, or a QoS, from the first entity to the second entity. In embodiments, a local cost measurement may depend on a configuration of the connections between the first entity to the second entity. For example, a longer distance between the first entity to the second entity, a higher local cost measurement from the first entity to the second entity may be. In some other embodiments, a local cost measurement may be independent from a distance between the first entity to the second entity.

Further in some other embodiments, a local cost measurement may be higher when a service may have a higher QoS class, even when a distance between the first entity to the second entity may be shorter when compared to other local cost measurements. In view of the one or more local cost measurements, a cost for a MEC host to provide the service or a cost for the service provider to provide the service may be calculated. A service may be allocated to a MEC host based on an allocation policy related to a cost for the MEC host to provide the service or a cost for the service provider to provide the service.

In embodiments, an apparatus for MEC may include a communication interface, a local cost measurements module, and a service allocation module coupled to the communication interface and the local cost measurements module. The communication interface may receive, from a UE, a request for a service to be provided to the UE. The local cost measurements module may collect a set of local cost measurements for the service, where the set of local cost measurements may include one or more local cost measurements from a first entity to a second entity along a path from the UE to a service provider to provide the service to the UE. The service allocation module may determine to allocate the service to a MEC host based on an allocation policy related to a cost for the MEC host to provide the service or a cost for the service provider to provide the service in view of the one or more local cost measurements.

In embodiments, an apparatus for MEC may include a communication interface and an end-to-end (E2E) service module coupled to the communication interface. The communication interface may send one or more requests to one or more entities to report a local cost measurement for providing a service to a UE by a service provider, where the one or more entities may include the UE, one or more access points, one or more MEC hosts, or the service provider, which may be along a path from the UE to the service provider. The E2E service module may collect the set of local cost measurements for the service to the UE, wherein the set of local cost measurements includes one or more local cost measurements from the one or more entities.

In embodiments, a method for providing a MEC service may include: receiving, a request for providing a service to a UE by a service provider; and collecting a set of local cost measurements for the service, wherein the set of local cost measurements may include one or more local cost measurements from a first entity to a second entity along a path from the UE to the service provider to provide the service to the UE. The method may further include determining to allocate the service to a MEC host based on an allocation policy related to a cost for the MEC host to provide the service or a cost for the service provider to provide the service in view of the one or more local cost measurements.

In embodiments, a MEC orchestrator or a MEC platform manager may initiate a request for collecting a set of local cost measurements for the service. A MEC host may include a local E2E cost controller to communicate with a local E2E cost controller of another MEC host to collect a set of local cost measurements. The set of local cost measurements may be combined to form a cost graph to be used to determine the allocation of a service to a MEC host. In embodiments, the cost graph may be updated when an additional MEC host is available to provide the service or a MEC host is no longer available to provide the service. In addition, a MEC orchestrator may make a determination to allocate the service to a MEC host based on an allocation policy related to a cost for the MEC host to provide the service or a cost for the service provider to provide the service in view of the one or more local cost measurements. In some embodiments, a service allocation module, resided in a MEC orchestrator or a MEC platform manager, may determine, based on an allocation policy, to allocate a service to a MEC host when a difference between a cost for the service provider to provide the service and a cost for the MEC host to provide the service is larger than or equal to a predetermined threshold. Moreover, a MEC orchestrator may predict a set of local cost measurements for the future based on historical data, and further make a determination to allocate a service to a MEC host.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Further, various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The description may use the phrases "in an embodiment," "in embodiments," "in some embodiments." and/or "in various embodiments," which may each refer to one or more of the same or different embodiments. Furthermore, the terms "comprising," "including," "having," and the like, as used with respect to embodiments of the present disclosure, are synonymous.

The phrase "A and/or B" means (A), (B), or (A and B). The phrases "A/B" and "A or B" mean (A). (B), or (A and B), similar to the phrase "A and/or B." For the purposes of the present disclosure, the phrase "at least one of A and B" means (A). (B), or (A and B).

As used hereinafter, including the claims, the term "unit," "engine," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). In some embodiments, the term "interface" or "interface circuitry" may include a processor and a memory device.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate." "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, autonomous functions of an autonomous car, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. An eNB may also be referred to as an eNodeB. An access point may be an eNB, a gNB, a BTS, or any other general base station. The term "RSU" may refer to any transportation infrastructure entity implemented in a gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example MEC system 100 including a MEC orchestrator 111 and a MEC platform manager 121 to allocate a service provider to provide a service to a UE 101 based on a set of local cost measurements for the service, in accordance with various embodiments. For clarity, features of the MEC system 100, the MEC orchestrator 111, the MEC platform manager 121, or the UE 101, may be described below as an example for understanding an example MEC system including a MEC orchestrator and a MEC platform manager to allocate a service provider to provide a service to a UE based on a set of local cost measurements for the service. It is to be understood that there may be more or fewer components included in the MEC system 100, the MEC orchestrator 111, the MEC platform manager 121, or the UE 101. Further, it is to be understood that one or more of the devices and components within the MEC system 100, the MEC orchestrator 111, the MEC platform manager 121, or the UE 101 may include additional and/or varying features from the description below, and may include any devices and components that one having ordinary skill in the art would consider and/or refer to as the devices and components of a MEC system including a MEC orchestrator and a MEC platform manager to allocate a service provider to provide a service to a UE based on a set of local cost measurements for the service.

In embodiments, the MEC system 100 may include the MEC orchestrator 111, the MEC platform manager 121, the UE 101, and a service provider 107 to provide a service to the UE 101. The service provider 107 may provide the service to the UE 101, through one or more access points. e.g., an access point 102, and an access point 103, or one or more MEC hosts. e.g., a MEC host 104, and a MEC host 105. The access point 102, and the access point 103 may be an eNB, a gNB, a BTS, etc. The MEC host 104 and the MEC host 105 may reside in an edge cloud 131, while the service provider 107 may reside in a remote cloud 133. The MEC orchestrator 111 may include a communication interface 113, a local cost measurements module 115, and a service allocation module 117. The MEC platform manager 121 may include a communication interface 125 and an E2E service module 123. The MEC host 104 may include an E2E cost controller 141, and the MEC host 105 may include an E2E cost controller 143.

In embodiments, the access point 102, or the access point 103, may provide access to the edge cloud 131 for the UE 101 through various technologies. For example, the access point 102, or the access point 103, may provide access to the edge cloud 131, the MEC host 104, or the MEC host 105 in long term evolution (LTE) technology, wireless local area network (WLAN), or new radio (NR) technology. Furthermore, there may be wired connections between the MEC host 104, or the MEC host 105, to the service provider 107, the MEC orchestrator 111, or the MEC platform manager 121.

A service may be provided by the service provider 107 to the UE 101 through a path coupling various access points and MEC hosts. For example, a service may be provided through a path coupling the UE 101, the access point 102, the MEC host 104, and the service provider 107. Additionally, a service may be provided through a path coupling the UE 101, the access point 103, the MEC host 105, and the service provider 107. Furthermore, a service may be provided through a path coupling the UE 101, the access point 102, and directly to the service provider 107 without going through a MEC host. For the descriptions herein, a path from a UE to a service provider may be an undirected path. In some other embodiments, a path may be a directed path.

To provide a service to the UE 101, there may be a local cost measurement associated with a connection from a first entity to a second entity along a path from the UE 101 to the service provider 107. For example, there may be a local cost measurement 141 associated with the UE 101 and the access point 102, a local cost measurement 142 associated with the UE 101 and the access point 103, a local cost measurement 143 associated with the access point 102 and the MEC host 104, a local cost measurement 144 associated with the access point 103 and the MEC host 105, a local cost measurement 145 associated with the MEC host 104 and the service provider 107, a local cost measurement 146 associated with the MEC host 105 and the service provider 107, and a local cost measurement 147 associated with the access point 102 and the service provider 107. The local cost measurement 141, the local cost measurement 142, the local cost measurement 143, the local cost measurement 144, the local cost measurement 145, the local cost measurement 146, and the local cost measurement 147, may collectively be referred to as a set of local cost measurements for the service from the service provider 107 to the UE 101. A local cost measurement of the set of local cost measurements may represent a latency, cost, or QoS, from a first entity to a second entity along a path from the UE 101 to the service provider 107. The local cost measurements shown in FIG. 1 are for direct connections between two entities along a path from the UE 101 and the service provider 107. In some other embodiments, a local cost measurement may be between two entities not directly coupled together. For example, a local cost measurement may exist from the UE 101 and the MEC host 104. Furthermore, the local cost measurements may include cost measurements taken in real time, or in a recent time. When the local cost measurement represents latency, e.g., a delay, it may be measured by various techniques, e.g., by inserting additional information to track transmitted packets between two entities. In some embodiments, the local cost measurements may include one or more local cost measurements from historical data, or a predicted value for a future time.

Figure 2:
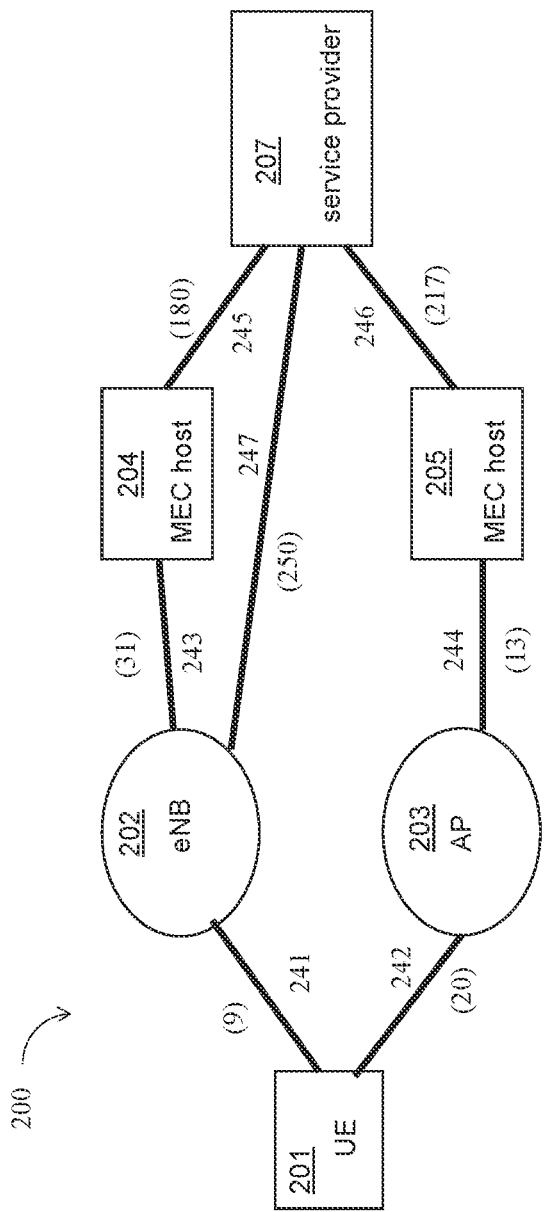
FIG. 2 illustrates an example cost graph constructed based on a set of local cost measurements for a service to indicate a cost for a MEC host or a service provider to provide the service to a UE, in accordance with various embodiments.

Based on the set of local cost measurements for the service from the service provider 107 to the UE 101, a cost for a MEC host to provide the service or a cost for the service provider to provide the service may be determined. Such costs may be indicated by a cost graph constructed based on the set of local cost measurements for the service. For example, as shown in FIG. 2, a cost graph 200 may be constructed based on the set of local cost measurements for the service as shown in FIG. 1. A cost for a path from a first entity to a second entity may be a sum of the local cost measurements along the path from the first entity to the second entity. When there may be multiple paths from a MEC host to the UE, a cost for the MEC host to provide the service to the UE may be a minimal cost among the multiple paths from the UE to the MEC host in the cost graph. Similarly, a cost for the service provider to provide the service may be a minimal cost among one or more paths from the UE to the service provider in the cost graph. More details of a cost graph may be presented in FIG. 2.

In embodiments, the MEC orchestrator 111 may include the communication interface 113, the local cost measurements module 115 coupled to the communication interface 113, and the service allocation module 117 coupled to the communication interface 113 and the local cost measurements module 115. In some embodiments, the MEC orchestrator 111 may perform some functions defined by European Telecommunications Standards Institute (ETSI) MEC standard. The communication interface 113 may receive, from the UE 101, a request for a service to be provided to the UE 101. In some embodiments, the communication interface 113 may receive multiple requests, from one or more UEs, to provide multiple services to the one or more UEs.

The local cost measurements module 115 may collect a set of local cost measurements for a service, e.g., the local cost measurement 141 to the local cost measurement 147. In embodiments, the local cost measurements module 115 may send one or more local cost measurement requests to the E2E service module 123 in the MEC platform manager 121, or the UE 101, to collect the set of local cost measurements for the service. In addition, the local cost measurements module 115 may receive one or more reports including the set of local cost measurements for the service from the E2E service module 123 or the UE 101.

The service allocation module 117 may determine to allocate the service to a MEC host based on an allocation policy 119 related to a cost for the MEC host to provide the service or a cost for the service provider to provide the service in view of the one or more local cost measurements. In some embodiments, the service allocation module 117 may construct a cost graph based on the set of local cost measurements for the service, and determine the cost for the MEC host to provide the service or the cost for the service provider to provide the service based on the cost graph. In embodiments, the service allocation module 117 may determine, based on the allocation policy 119, to allocate the service to the MEC host 104 when a difference between the cost for the service provider 107 to provide the service to the UE 101 and the cost for the MEC host 104 to provide the service to the UE 101 may be larger than or equal to a predetermined threshold. As shown in FIG. 1, the cost for the MEC host 104 to provide the service to the UE 101 may be a sum of the local cost measurement 141 and the local cost measurement 143. The cost for service provider 107 to provide the service to the UE 101 may be a minimal among three paths including a sum of the local cost measurement 141 and the local cost measurement 147, a sum of the local cost measurement 141, the local cost measurement 143, and the local cost measurement 145, and a sum of the local cost measurement 142, the local cost measurement 144, and the local cost measurement 146.

In embodiments, the MEC platform manager 121 may include the communication interface 125 and the E2E service module 123 coupled to the communication interface 125. The communication interface 125 may receive a request, from the UE 101 or the MEC orchestrator 111, to collect the set of local cost measurements for providing the service to the UE 101. In some embodiments, the communication interface 125 may receive multiple requests, from one or more UEs, or the MEC orchestrator 111, to collect multiple sets of local cost measurements for providing multiple services to the one or more UEs, where a service may have a set of local cost measurements. The communication interface 125 may send one or more requests to one or more entities, e.g., the UE 101, the access point 102, the access point 103, the MEC host 104, the MEC host 105, or the service provider 107, to report a local cost measurement for providing a service to a UE by a service provider. The one or more entities including the UE 101, the access point 102, the access point 103, the MEC host 104, the MEC host 105, or the service provider 107 may be along a path from the UE 101 to the service provider 107. In some embodiments, the communication interface may send multiple requests to the one or more entities to report the one or more local cost measurements for providing multiple services to the UE 101, or to multiple UEs.

In embodiments, the E2E service module 123 may collect the set of local cost measurements for the service to the UE, wherein the set of local cost measurements includes one or more local cost measurements from the one or more entities. For example, the E2E service module 123 may collect the set of local cost measurements for the service from the service provider 107 to the UE 101 including the local cost measurement 141, the local cost measurement 142, the local cost measurement 143, the local cost measurement 144, the local cost measurement 145, the local cost measurement 146, and the local cost measurement 147.

In some embodiments, the E2E service module 123 may further construct a cost graph based on the set of local cost measurements for the service. For example, the E2E service module 123 may construct the cost graph 200 as shown in FIG. 2 to represent the set of local cost measurements for the service from the service provider 107 to the UE 101 including the local cost measurement 141, the local cost measurement 142, the local cost measurement 143, the local cost measurement 144, the local cost measurement 145, the local cost measurement 146, and the local cost measurement 147.

In some embodiments, the E2E service module 123 may further send to the MEC orchestrator 111 a report including the set of local cost measurements for the service, or the cost graph based on the set of local cost measurements for the service. The E2E service module may send the cost graph in a tag-length-value format including one or more tags, and the one or more tags include a tag for a graph, a tag for a node, a tag for an edge, or a tag for a local cost measurement. More details may be found in the description for FIG. 2. In addition, the E2E service module 123 may update a cost graph when an additional MEC host is available to provide the service or a MEC host is no longer available to provide the service.

In embodiments, the MEC host 104 may include the E2E cost controller 141, and the MEC host 105 ma include the E2E cost controller 143, to communicate with the E2E service module 123 in the MEC platform manager 121, or the MEC orchestrator 111 to collect a set of local cost measurements. In some embodiments, the E2E cost controller in a MEC host may communicate with another E2E cost controller in another MEC host when there is a connection between the two MEC hosts. In addition, the E2E cost controller 141 or the E2E cost controller 143 may be implemented as MEC applications.

FIG. 2 illustrates an example cost graph 200 constructed based on a set of local cost measurements for a service to indicate a cost for a MEC host, e.g., a MEC host 204 or a MEC host 205, or a service provider 207 to provide the service to a UE 201, in accordance with various embodiments. The cost graph 200 may include one or more nodes corresponding to a UE, a service provider, one or more access points, and one or more MEC hosts. An edge between two nodes of the cost graph 200 may correspond to a local cost measurement between the two nodes. In detail, the cost graph 200 may include nodes representing the UE 201, an access point 202, an access point 203, the MEC host 204, the MEC host 205, and the service provider 207, which may be examples of the UE 101, the access point 102, the access point 103, the MEC host 104, the MEC host 105, and the service provider 107, respectively. The access point 202, or the access point 203 may be an eNB, a gNB, a BTS, etc. The cost graph 200 may be constructed for one or more services. In embodiments, the cost graph 200 may include a set of local cost measurements, e.g., a local cost measurement 241 associated with the UE 201 and the access point 202, a local cost measurement 242 associated with the UE 201 and the access point 203, a local cost measurement 243 associated with the access point 202 and the MEC host 204, a local cost measurement 244 associated with the access point 203 and the MEC host 205, a local cost measurement 245 associated with the MEC host 204 and the service provider 207, a local cost measurement 246 associated with the MEC host 205 and the service provider 207, and a local cost measurement 247 associated with the access point 202 and the service provider 207. The local cost measurement 241, the local cost measurement 242, the local cost measurement 243, the local cost measurement 244, the local cost measurement 245, the local cost measurement 246, and the local cost measurement 247, may be similar to the local cost measurement 141, the local cost measurement 142, the local cost measurement 143, the local cost measurement 144, the local cost measurement 145, the local cost measurement 146, and the local cost measurement 147, shown in FIG. 1. As an example, the local cost measurement 241, the local cost measurement 242, the local cost measurement 243, the local cost measurement 244, the local cost measurement 245, the local cost measurement 246, and the local cost measurement 247, may have a local cost measure as 9, 20, 31, 13, 180, 217, and 250, respectively. These local cost measurements. e.g., 9, 20, 31, 13, 180, 217, and 250, may represent a latency in microsecond (ms), or a level of QoS for the service, or a level of financial cost. In some embodiments, the UE 201 and the access point 202 may have a distance 9, while the MEC host 204 and the service provider 207 may have a distance 180. In some other embodiments, a data packet may take 9 ms to travel between the UE 201 and the access point 202, while a data packet may take 180 ms to travel between the MEC host 204 and the service provider 207. Further, in some other embodiments, a financial cost of 9 may incur for a data packet to travel between the UE 201 and the access point 202, and a financial cost of 180 may incur for a data packet to travel between the MEC host 204 and the service provider 207.

A cost for the MEC host 204 to provide the service to the UE 201 may be a sum of the local cost measurement 241 and the local cost measurement 243, which is 9+31=40, along a path from the MEC host 204 to the UE 201. A cost for the service provider 207 to provide the service to the UE 201 may be a minimal cost among paths from the service provider 207 to the UE 201. A first path may have a cost equal to a sum of the local cost measurement 241 and the local cost measurement 247 (9+250=259). A second path may have a cost equal to a sum of the local cost measurement 241, the local cost measurement 243, and the local cost measurement 245 (9+31+180=220). A third path may have a cost equal to a sum of the local cost measurement 242, the local cost measurement 244, and the local cost measurement 246 (20+13+217=250). Therefore, the cost for service provider 207 to provide the service to the UE 201 may be a minimal among three paths 259, 220, and 260, which is 220.

In embodiments, a service allocation module of a MEC orchestrator, e.g., the service allocation module 117 of the MEC orchestrator 111 may determine to allocate a service to a MEC host based on an allocation policy related to a cost for the MEC host to provide the service or a cost for the service provider to provide the service in view of the one or more local cost measurements. For example, an allocation policy may enable a service to be allocated to a MEC host when a difference between a cost for a service provider to provide the service to the UE and a cost for the MEC host to provide the service to the UE may be larger than or equal to a predetermined threshold 40. As shown above, the difference between the cost for the service provider 207 to provide the service to the UE 201 and the cost for the MEC host 204 to provide the service to the UE 201 is 220−40=180. Therefore, the service allocation module 117 may allocate the service to the MEC host 204 so that the UE 201 may have much better improvements for the service.

In some other embodiments, if the local cost measurement 243 may be increased from 31 to 231, then the cost for the MEC host 204 to provide the service to the UE 201 may become 231+9=240, while the cost for service provider 207 to provide the service to the UE 201 may be a minimal cost among the three paths, which turns out to be the 250 for the path including the local cost measurement 242, the local cost measurement 244, and the local cost measurement 246. In such a situation, a difference between the cost for the service provider 207 to provide the service to the UE 201 and the cost for the MEC host 204 to provide the service to the UE 201 is 250−240=10, which is less than the predetermined threshold 40. Hence, the service allocation module 117 may determine not to allocate the service to the MEC host 204 because the gain of 10 in the cost would not be significant enough with respect to the predetermined threshold 40.

In embodiments, the MEC platform manager 121 may send the local cost measurement 241, the local cost measurement 242, the local cost measurement 243, the local cost measurement 244, the local cost measurement 245, the local cost measurement 246, and the local cost measurement 247, to the MEC orchestrator 111 so that the MEC orchestrator 111 may construct the graph 200.

In embodiments, the MEC platform manager 121 may construct the cost graph 200 and may send the cost graph 200 to the MEC orchestrator 111. For example, the E2E service module 123 may send the cost graph 200 in a tag-length-value format including one or more tags, and the one or more tags include a tag for a graph, a tag for a node, a tag for an edge, or a tag for a local cost measurement. Examples of such tag-length-value formats may be shown below, where the field TAG may include 1-byte label of the name of the node, the field type may be the tag type, the field value may be the value for the tag type, and type-length-value (TLV), and the field comment may include text comments.

| TAG | Type | Value | Comments |
| --- | --- | --- | --- |
| 0 × 10 | Graph | [GraphID, TLV] | TLV is the container for the Graph |
| 0 × 20 | Node | [NodeID, TLV] | TLV is the container for the Node |
| 0 × 30 | Edge | [EdgeID, NodeID1, NodeID2, TLV] | TLV is the container for the Edge information (e.g. delay or cost functions) |
| 0 × 40 | Cost Function | [Type, String] | The string, if present, describes the cost function. |
| 0 × 41 | Delay | [DELAY] | Expressed in ms |
| 0 × 42 | Normalized weight | [WEIGHT] | Normalized to the maximum (100) |

Figure 3:
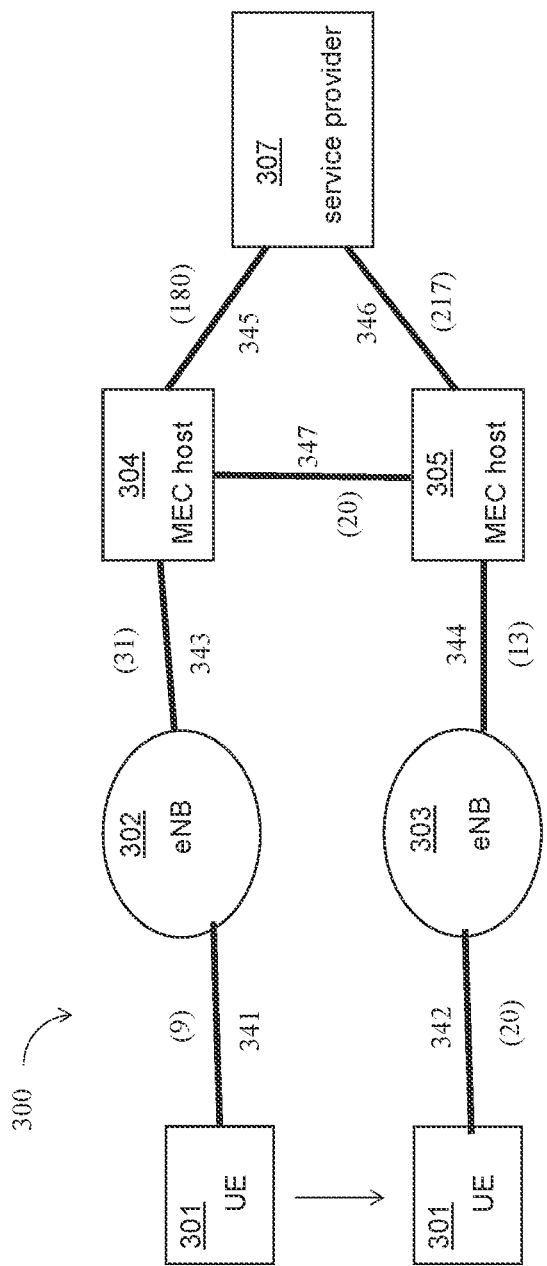
FIG. 3 illustrates another example cost graph constructed based on a set of local cost measurements for a service to indicate a cost for a MEC host or a service provider to provide the service to a UE, in accordance with various embodiments.

FIG. 3 illustrates another example cost graph 300 constructed based on a set of local cost measurements for a service to indicate a cost for a MEC host, e.g., a MEC host 304 or a MEC host 305, or a service provider 307 to provide the service to a UE 301, in accordance with various embodiments. In detail, the cost graph 300 may include nodes representing the UE 301, an access point 302, an access point 303, the MEC host 304, the MEC host 305, and the service provider 307, which may be examples of the UE 101, the access point 102, the access point 103, the MEC host 104, the MEC host 105, and the service provider 107, respectively. For example, the access point 302, or the access point 303 may be an eNB, a gNB, a BTS, etc.

In embodiments, the UE 301 may be initially in communication with the access point 302 in a first cell, not shown. The UE 301 may move to another cell to be in communication with the access point 303. For example, the UE 301 may be handed over in a wireless cellular technology from a first base station to a second base station.

The cost graph 300 may include a set of local cost measurements, e.g., a local cost measurement 341 having a value 9 associated with the UE 301 and the access point 302, a local cost measurement 342 having a value 20 associated with the UE 301 and the access point 303, a local cost measurement 343 having a value 31 associated with the access point 302 and the MEC host 304, a local cost measurement 344 having a value 13 associated with the access point 303 and the MEC host 305, a local cost measurement 345 having a value 180 associated with the MEC host 304 and the service provider 307, a local cost measurement 346 having a value 217 associated with the MEC host 305 and the service provider 307, and a local cost measurement 347 having a value 20 associated with the MEC host 304 and the MEC host 305.

Initially, the MEC host 304 may provide a service to the UE 301 through the access point 302. After the UE 301 is moved from in communication with the access point 302 to be in communication with the access point 303, the UE 301 may not be in communication with the access point 302. However, a cost for the ME host 304 to provide the service to the UE 301 through the access point 303 may be equal to 20+13+20=53, while a cost for the ME host 305 to provide the service to the UE 301 through the access point 303 may be equal to 20+13=33, with a difference of 20. Based on an allocation policy similar to the one used in FIG. 2, the service allocation module 117 may not allocate the service to the MEC host 305 since the cost difference of 20 is less than the predetermined threshold 40. Therefore, when the UE 301 may be handed over from the access point 302 to the access point 303, the service may still be provided by the previous service provider, the ME host 304, since the improvements of cost 20 is less than the predetermined threshold 40.

Figure 4:
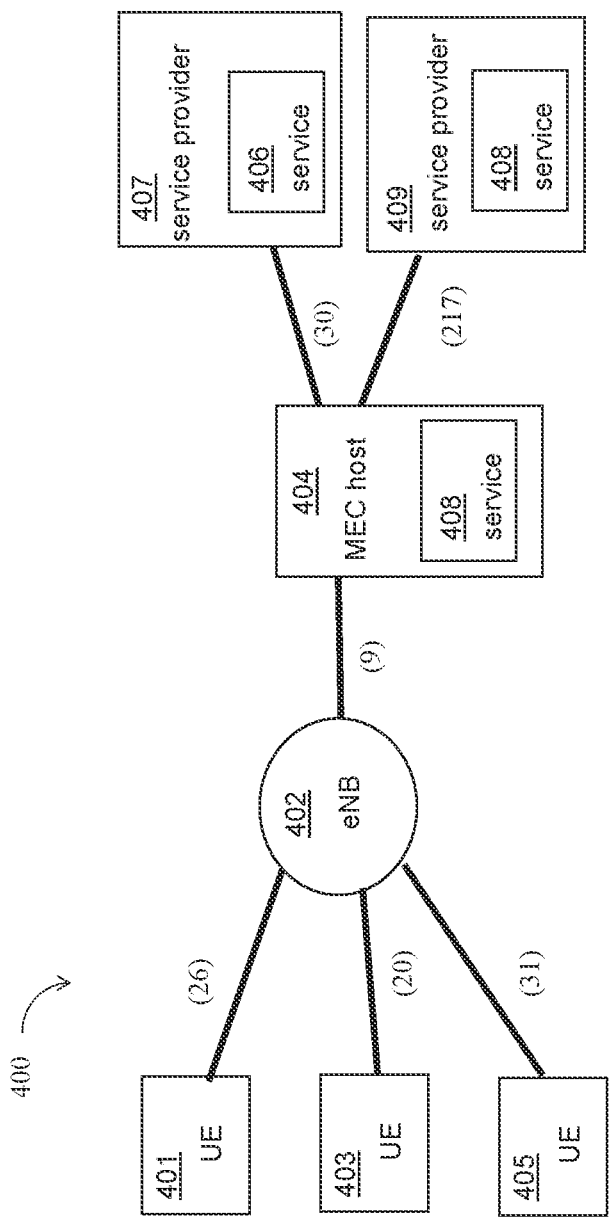
FIG. 4 illustrates an example cost graph constructed based on a set of local cost measurements for multiple services to indicate costs for one or more MEC host or one or more service providers to provide the multiple services to multiple UEs, in accordance with various embodiments.

FIG. 4 illustrates another example cost graph 400 constructed based on a set of local cost measurements for multiple services to indicate costs for one or more MEC host, e.g., a MEC host 404, or one or more service providers. e.g., a service provider 407, and a service provider 409, to provide the multiple services, e.g., a service 406, and a service 408, to multiple UEs, e.g., a UE 401, a UE 403, and a UE 405, in accordance with various embodiments.

In embodiments, the UE 401, the UE 403, and the UE 405 may be in communication with an access point 402, which is further in communication with the MEC host 404. The access point 402 may be an eNB, a gNB, a BTS, etc. In addition, the MEC host 404 may be in communication with the service provider 407, and the service provider 409. As indicated by the cost graph 400, there may be a local cost measurement with a value 26 for the UE 401 and the access point 402, a local cost measurement with a value 20 for the UE 403 and the access point 402, a local cost measurement with a value 31 for the UE 405 and the access point 402, a local cost measurement with a value 9 for the access point 402 and the MEC host 404, a local cost measurement with a value 30 for the MEC host 404 and the service provider 407, and a local cost measurement with a value 217 for the MEC host 404 and the service provider 409.

In embodiments, the UE 401 may request the service 406, the UE 403 may request the service 406 provided by the service provider 407, while the UE 405 may request the service 408 provided by the service provider 409. The communication interface 113 of the MEC orchestrator 111 may receive a request for the service 406 from the UE 401, a request for the service 406 from the UE 403, and a request for the service 408 from the UE 405. The local cost measurements module 115 may collect multiple sets of local cost measurements for the multiple services, e.g., the service 406 and the service 408. Based on the similar calculation as shown for FIG. 2, there may be a difference of 217 by allocating the service 408 to be provided by the MEC host 404 instead of being provided by the service provider 409. On the other hand, there may be only a difference of 30 by allocating the service 406 to be provided by the MEC host 404 instead of being provided by the service provider 407. The difference of cost of 217 may be larger than the predetermined threshold 40, while a difference of cost of 30 may be smaller than the predetermined threshold 40. The service allocation module 117 may determine, based on the multiple sets of local cost measurements and an allocation policy, to allocate a service of the multiple services to a MEC host. For example, based on the local cost measurements indicated by the cost graph 400, the service allocation module 117 may allocate the service 408 to be provided by the MEC host 404, while keeping the service 406 to be provided by the service provider 407.

Figure 5:
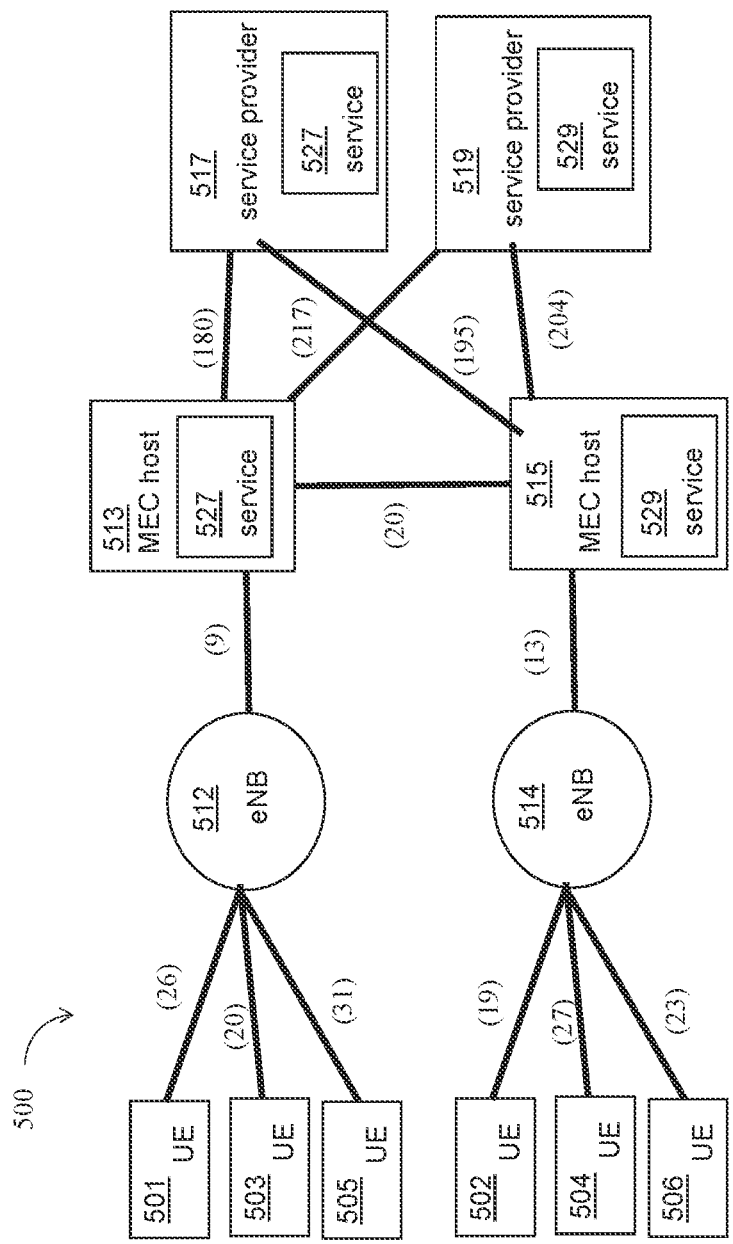
FIG. 5 illustrates another example cost graph constructed based on a set of local cost measurements for multiple services to indicate costs for one or more MEC host or one or more service providers to provide the multiple services to multiple UEs, in accordance with various embodiments.

FIG. 5 illustrates another example cost graph 500 constructed based on a set of local cost measurements for multiple services to indicate costs for one or more MEC host, e.g., a MEC host 513 and a MEC host 515, or one or more service providers, e.g., a service provider 517, and a service provider 519, to provide the multiple services, e.g., a service 527, and a service 529, to multiple UEs. e.g., a UE 501, a UE 502, a UE 503, a UE 504, a UE 505, and a UE 506, in accordance with various embodiments.

In embodiments, the UE 501, the UE 503, and the UE 505 may be in communication with an access point 512, which is further in communication with the MEC host 513. In addition, the MEC host 513 may be in communication with the service provider 517, and the service provider 519. The UE 502, the UE 504, and the UE 506 may be in communication with an access point 514, which is further in communication with the MEC host 515. The access point 512 or the access point 514 may be an eNB, a gNB, a BTS, etc. In addition, the MEC host 515 may be in communication with the service provider 517, and the service provider 519. As indicated by the cost graph 500, there may be a local cost measurement with a value 26 for the UE 501 and the access point 512, a local cost measurement with a value 20 for the UE 503 and the access point 512, a local cost measurement with a value 31 for the UE 505 and the access point 512, a local cost measurement with a value 9 for the access point 512 and the MEC host 513, a local cost measurement with a value 180 for the MEC host 513 and the service provider 517, and a local cost measurement with a value 217 for the MEC host 513 and the service provider 519. As shown in FIG. 5, the local cost measurement for the access point 512 to the MEC host 513 may have a value 9 for both the service 527 provided by the service provider 517 and the service 529 provided by the service provider 519. In some other embodiments, the local cost measurement for the access point 512 to the MEC host 513 may have a value for the service 527 provided by the service provider 517 through the link from the access point 512 to the MEC host 513, and may have a different value for the service 529 provided by the service provider 519, not shown. In addition, there may be a local cost measurement with a value 19 for the UE 502 and the access point 514, a local cost measurement with a value 27 for the UE 504 and the access point 514, a local cost measurement with a value 23 for the UE 506 and the access point 514, a local cost measurement with a value 13 for the access point 514 and the MEC host 515, a local cost measurement with a value 195 for the MEC host 515 and the service provider 517, and a local cost measurement with a value 204 for the MEC host 515 and the service provider 519. Furthermore, there may be a local cost measurement with a value 20 for the MEC host 515 and the MEC host 513.

In embodiments, the UE 501 and the UE 503 may request the service 527 provided by the service provider 517, the UE 505 may request the service 529 provided by the service provider 519. Similarly, the UE 502, the UE 504 may request the service 527 provided by the service provider 517, the UE 506 may request the service 529 provided by the service provider 519. The communication interface 113 of the MEC orchestrator 111 may receive the above requests. The local cost measurements module 115 may collect multiple sets of local cost measurements for the multiple services, e.g., the service 527 and the service 529.

Based on the similar calculation as shown for FIG. 2, there may be a difference of 180 by allocating the service 527 to be provided by the MEC host 513 instead of being provided by the service provider 517, and a difference of 217 by allocating the service 529 to be provided by the MEC host 513 instead of being provided by the service provider 519. Similarly, there may be a difference of 195 by allocating the service 527 to be provided by the MEC host 515 instead of being provided by the service provider 517, and a difference of 204 by allocating the service 529 to be provided by the MEC host 515 instead of being provided by the service provider 519. All those differences of costs identified are larger than the predetermined threshold 40 based on a similar allocation policy as illustrated in FIG. 2.

In one embodiments, the service allocation module 117 may allocate the service 527 and the service 529 to be provided by the MEC host 513, and further allocate the service 527 and the service 529 to be provided by the MEC host 515 as well. However, since the local cost measurement between the MEC host 513 and the MEC host 515 has a value of 20, the service allocation module 117 may allocate the service 527 to be provided by the MEC host 513, and allocate the service 529 to be provided by the MEC host 515. Additionally and alternatively, the service allocation module 117 may allocate the service 529 to be provided by the MEC host 513, and allocate the service 527 to be provided by the MEC host 515. Compared to allocating both the service 527 and the service 529 to be provided by the MEC host 513 and the MEC host 515, allocating only one service, e.g., the service 527 or the service 529, to the MEC host 513 and the MEC host 515 may save computing resources for the MEC host 513 and the MEC host 515 while achieving similar service cost.

Embodiments illustrated in FIGS. 2-5 are only for examples and not limiting. There may be other scenarios with different set of local cost measurements. A MEC orchestrator may allocate the service to a MEC host based on an allocation policy related to a cost for the MEC host to provide the service or a cost for the service provider to provide the service in view of the one or more local cost measurements. In some embodiments, the MEC orchestrator may allocate the service based on a cost graph constructed in view of the one or more local cost measurements.

Figure 6:
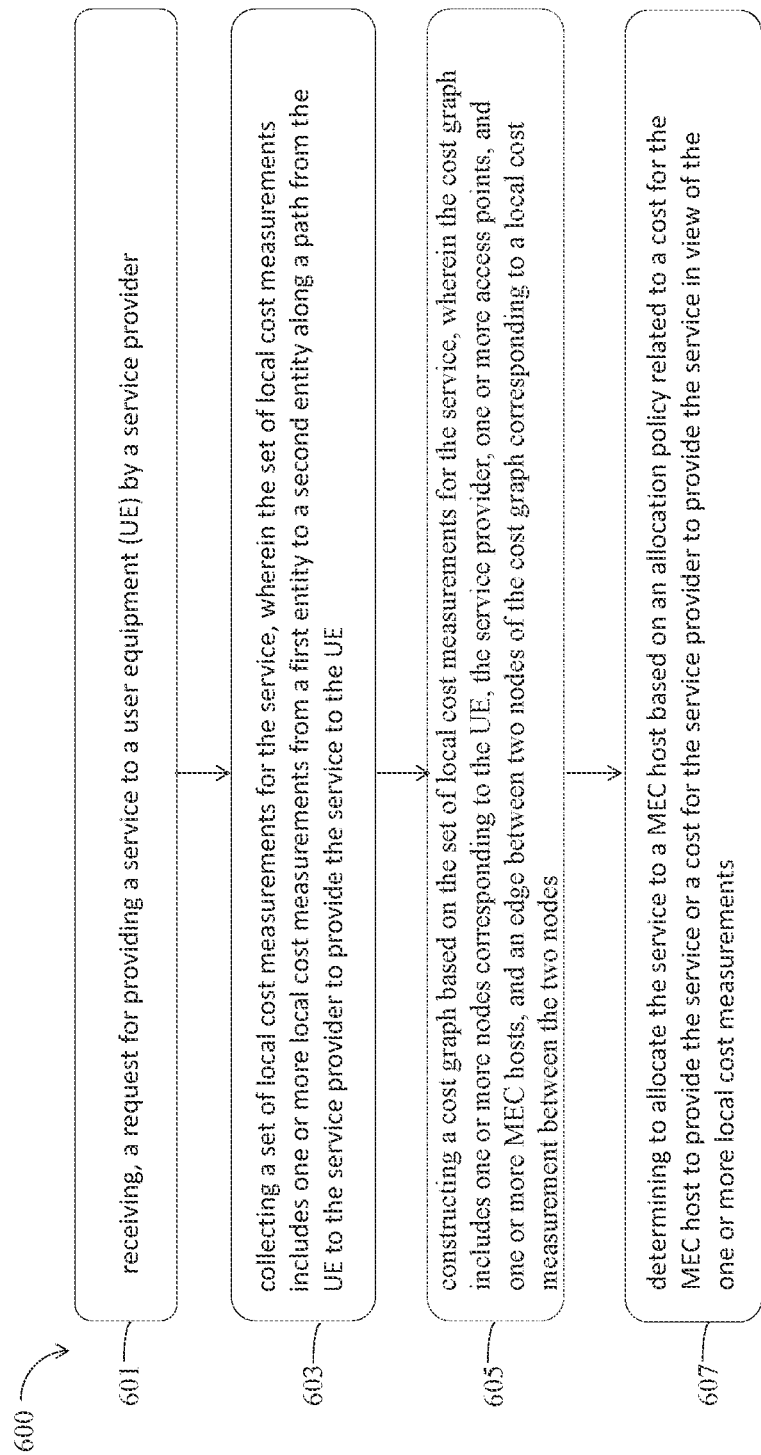
FIG. 6 illustrates an example process for allocating a service provider to provide a service to a UE based on a set of local cost measurements for the service, in accordance with various embodiments.

FIG. 6 illustrates an example process 600 for allocating a service provider to provide a service to a UE based on a set of local cost measurements for the service, in accordance with various embodiments. In embodiments, the process 600 may be a process performed by the MEC orchestrator 111 in FIG. 1.

The process 600 may start at an interaction 601. During the interaction 601, a request for providing a service to a UE by a service provider may be received. For example, during the interaction 601, the communication interface 113 may receive, from the UE 101, a request for a service to be provided to the UE 101.

During an interaction 603, a set of local cost measurements for the service may be collected. The set of local cost measurements may include one or more local cost measurements from a first entity to a second entity along a path from the UE to the service provider to provide the service to the UE. For example, during the interaction 603, the local cost measurements module 115 may collect a set of local cost measurements for the service. As described in FIG. 1, the set of local cost measurements for the service may include the local cost measurement 141, the local cost measurement 142, the local cost measurement 143, the local cost measurement 144, the local cost measurement 145, the local cost measurement 146, and the local cost measurement 147.

During an interaction 605, a cost graph based on the set of local cost measurements for the service may be constructed. The cost graph may include one or more nodes corresponding to the UE, the service provider, one or more access points, and one or more MEC hosts. An edge between two nodes of the cost graph may correspond to a local cost measurement between the two nodes. For example, during the interaction 605, the service allocation module 117 may construct the cost graph 200, which includes nodes corresponding to the UE 101, the access point 102, the access point 103, the MEC host 104, the MEC host 105, and the service provider 107.

During an interaction 607, a determination may be made to allocate the service to a MEC host based on an allocation policy related to a cost for the MEC host to provide the service or a cost for the service provider to provide the service in view of the one or more local cost measurements. For example, during the interaction 607, the service allocation module 117 may determine to allocate the service to the MEC host 104 based on an allocation policy as described in FIG. 2.

Figure 7:
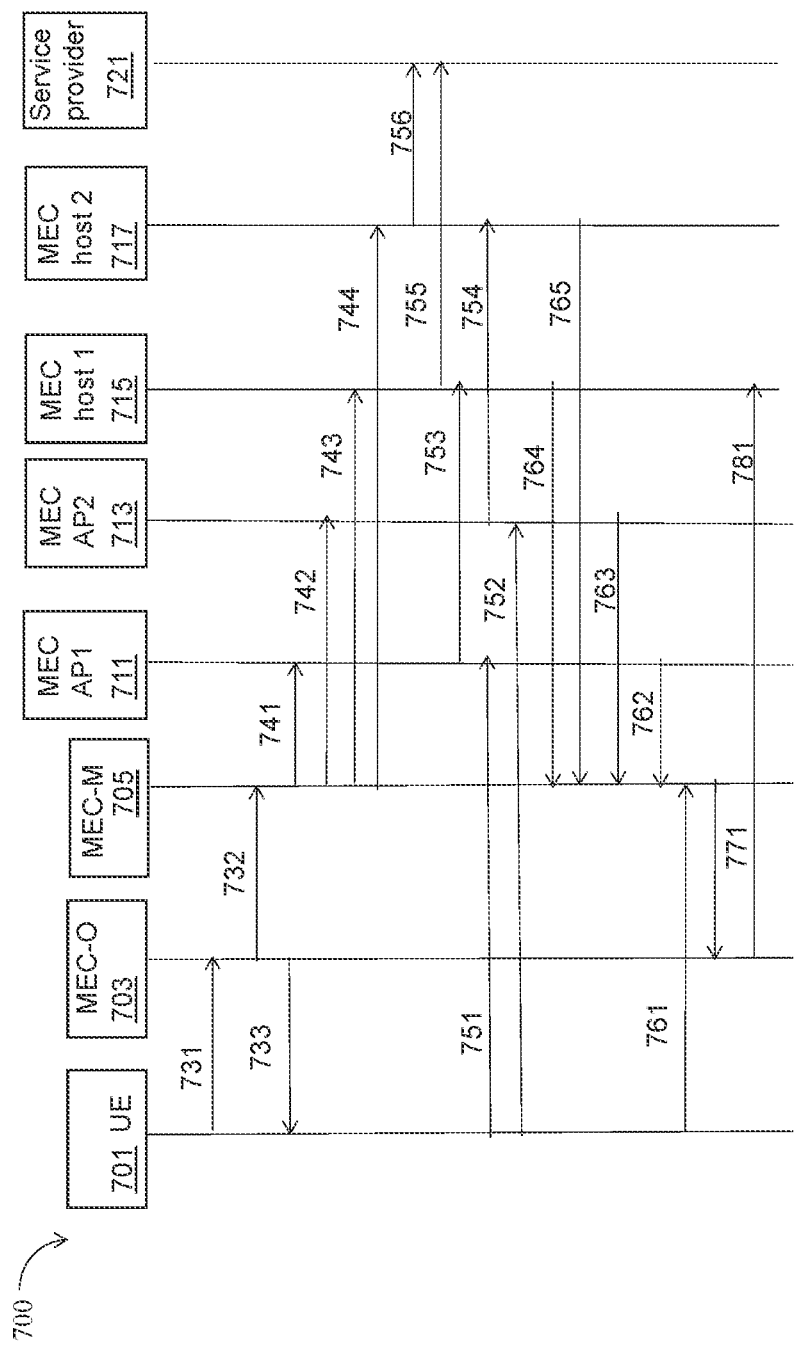
FIG. 7 illustrates an example sequence diagram for a MEC system allocating a service provider to provide a service to a UE based on a set of local cost measurements for the service, in accordance with various embodiments.

FIG. 7 illustrates an example sequence diagram for a MEC system 700 allocating a service provider to provide a service to a UE 701 based on a set of local cost measurements for the service, in accordance with various embodiments. The MEC system 700 includes the UE 701, a MEC orchestrator 703, a MEC platform manager 705, an access point 711, an access point 713, a MEC host 715, a MEC host 717, and a service provider 721, which may be similar to the UE 101, the MEC orchestrator 111, the MEC platform manager 121, the access point 102, the access point 103, the MEC host 104, the MEC host 105, and the service provider 107, respectively. The sequence of interactions shown in FIG. 7 is for examples only. The MEC system 700 may perform a different sequence of interactions to allocate a service provider to provide a service to the UE 701.

During an interaction 731, the UE 701 may send a request to the MEC orchestrator 703 for providing a service to the UE 701 by the service provider 721. During an interaction 732, the MEC orchestrator 703 may send a local cost measurement request to the MEC platform manager 705.

During an interaction 733, the MEC orchestrator 703 may send a local cost measurement request to the UE 701.

During interactions 741, 742, 743, and 744, the MEC platform manager 705 may send a local cost measurement request to the access point 711, the access point 713, the MEC host 715, and the MEC host 717, respectively. The local cost measurement request sent by the MEC platform manager 705 may include the service information, the endpoint for the local cost measurement to be performed, a periodicity of the local cost measurement, or a maximum number of periodic measurements that may be performed. When the cost is a latency, a latency measurement may be performed on the packet level.

During interactions 751, 752, 753, 754, 755, and 756, the UE 701, the access point 711, the access point 713, the MEC host 715, and the MEC host 717 may perform the local cost measurement to the given endpoint for the service, following the periodicity.

During interactions 761, 762, 763, 764, and 765, the MEC platform manager 705 may receive reports of local cost measurements from the UE 701, the access point 711, the access point 713, the MEC host 715, and the MEC host 717. There may be multiple reports of local cost measurements received periodically following the periodicity.

During an interaction 771, the MEC platform manager 705 may send the local cost measurements to the MEC orchestrator 703. The local cost measurements may include the local cost measurements collected by UE 701, the access point 711, the access point 713, the MEC host 715, and the MEC host 717. The MEC orchestrator 703 may determine to allocate the service to a MEC host based on an allocation policy related to a cost for the MEC host to provide the service or a cost for the service provider to provide the service in view of the one or more local cost measurements.

During an interaction 781, the MEC orchestrator 703 may allocate the service to the MEC host 715.

Figure 8:
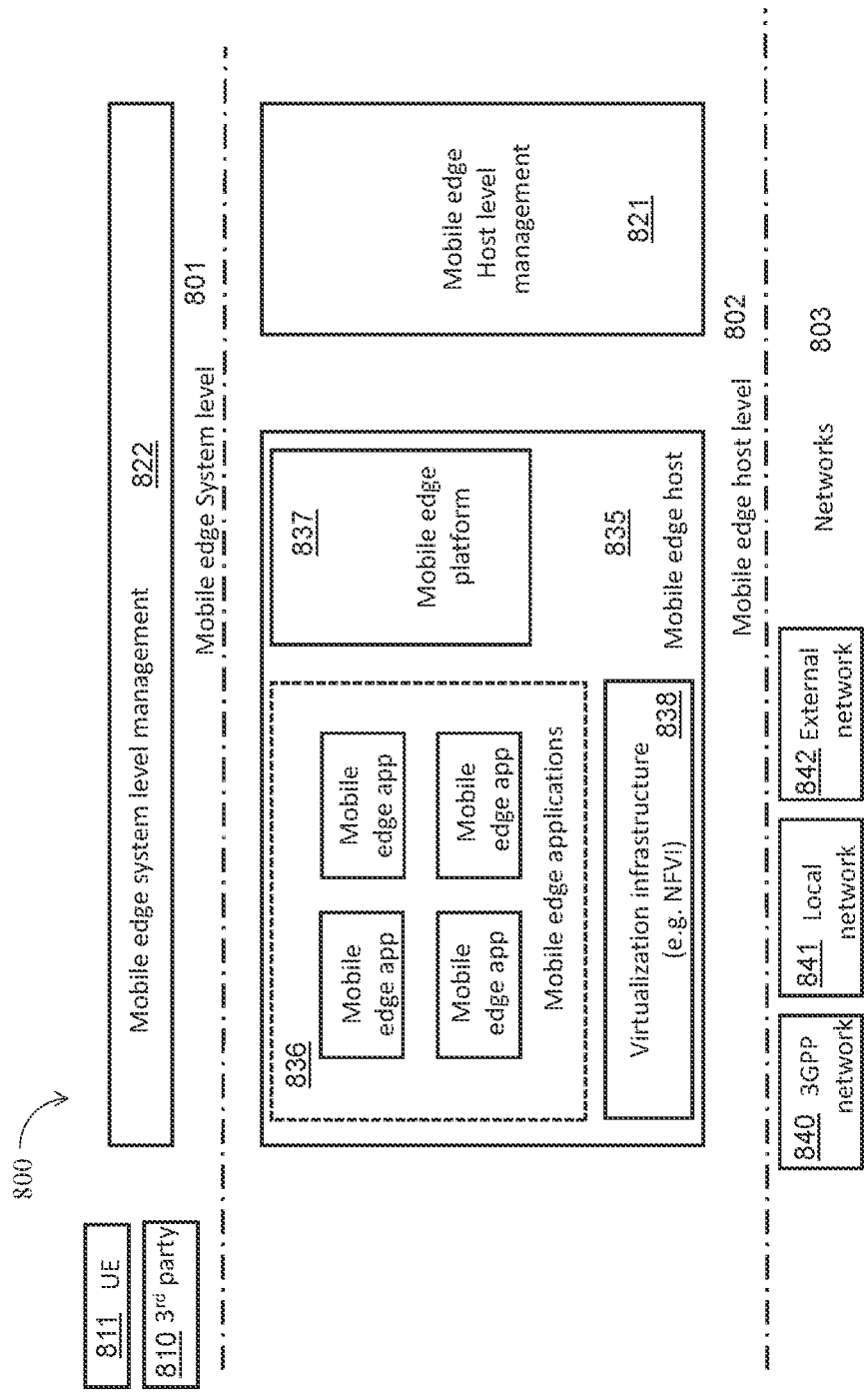
FIG. 8 illustrates an example MEC framework in accordance with various embodiments.

FIG. 8 illustrates an example MEC framework 800 in accordance with various embodiments. The MEC framework 800 is an example structure of the MEC environment. MEC enables implementation of mobile edge applications 836 as software-only entities that run on top of a virtualisation infrastructure 838, which is located in or close to the network edge. The MEC framework 800 shows the general entities involved, and these entities can be grouped into system level 801, host level 802, and network level 803 entities.

The mobile edge system level 801 includes mobile edge system level management 822, UE 811 (which may be the same or similar to the other UEs or terminals discussed herein), and 3$^{rd}$ Party entities 810. The mobile edge host level 802 includes mobile edge host level management 821 and mobile edge host 835. The mobile edge host 8135 includes the mobile edge platform 837, mobile edge applications 836, and virtualisation infrastructure 838. The network level 803 includes various external network level entities, such as a 3GPP network 840, a local network 841, and an external network 842. These entities are discussed in more detail with regard to FIG. 9.

Figure 9:
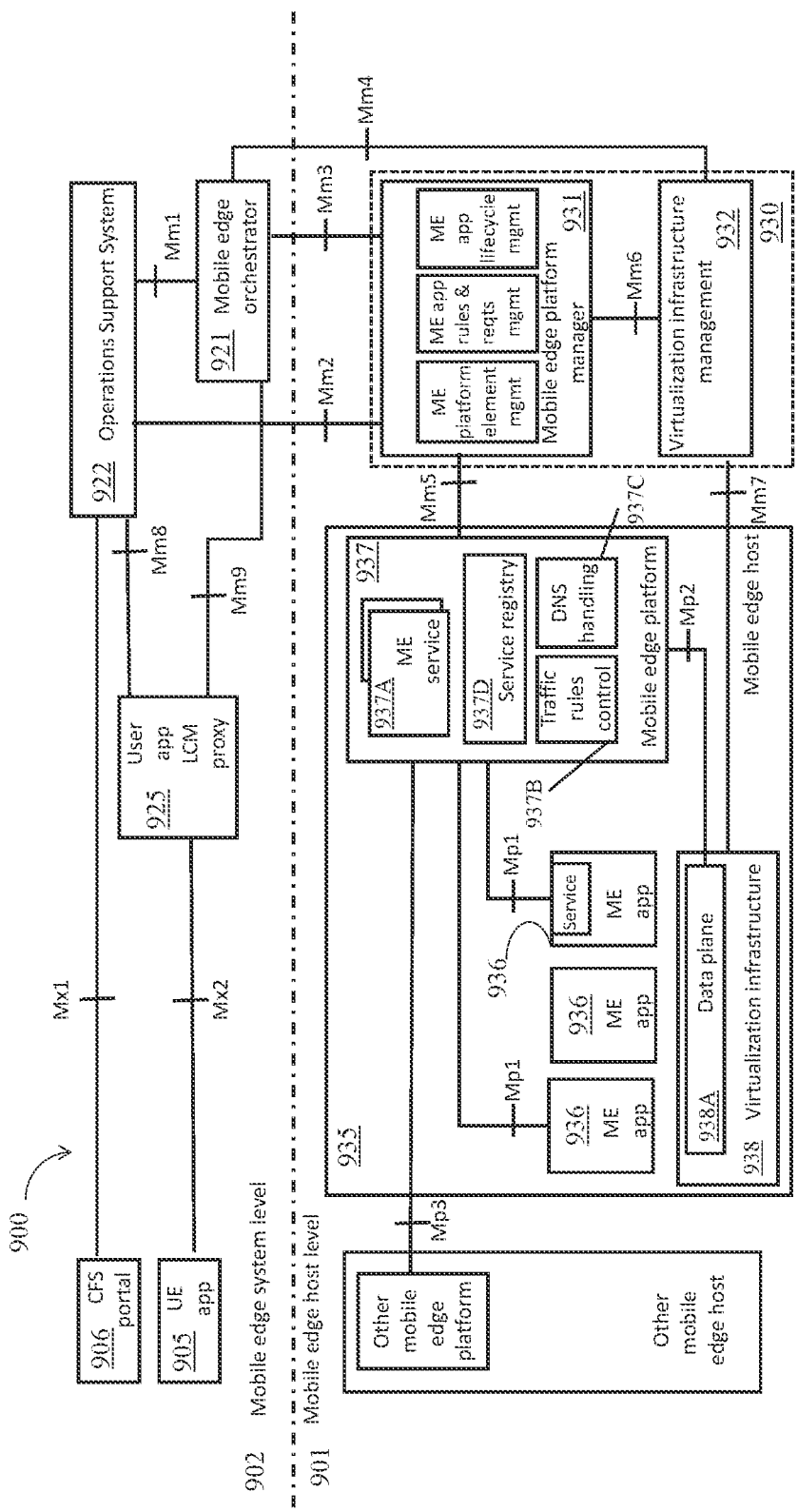
FIG. 9 illustrates an example MEC system architecture in accordance with various embodiments.

FIG. 9 illustrates an example MEC system architecture in accordance with various embodiments. The MEC system of FIG. 9 may include a mobile edge host level 901 and a mobile edge system level 902. The mobile edge host level 901 may include mobile edge hosts 935 and mobile edge management 930, which provide functionality to run mobile edge applications (ME apps) 936 within an operator network or a subset of an operator network.

The mobile edge host 935 may be an entity that contains a mobile edge platform 937 and a virtualization infrastructure 938 which provides compute, storage, and network resources, for the purpose of running ME apps 936. The virtualization infrastructure 938 includes a data plane 938A that executes the traffic rules received by the mobile edge platform, and routes the traffic among applications (e.g., ME apps 936), ME services 937A. DNS server/proxy (see e.g., via DNS handling entity 937C), and 3GPP network 840, local networks 841, and external networks 842, as shown in FIG. 8.

The mobile edge platform 937 within the mobile edge host 935 may be a collection of essential functionality required to run ME apps 936 on a particular virtualization infrastructure 938 and enable them to provide and consume mobile edge services 937A. The mobile edge platform 937 can also provide various services and/or functions, such as offering an environment where the ME apps 936 can discover, advertise, consume and offer mobile edge services 937A (discussed infra), including mobile edge services available via other platforms when supported. The mobile edge platform 937 may receive traffic rules from the mobile edge platform manager 931, applications, or services, and instruct the data plane accordingly (see e.g., Traffic Rules Control 937B). The mobile edge platform 937 may send instructions to the data plane 938A within the virtualization infrastructure 938 via the Mp2 reference point. The Mp2 reference point between the mobile edge platform 937 and the data plane 938A of the virtualization infrastructure 938 may be used to instruct the data plane 938A on how to route traffic among applications, networks, services, etc. In some implementations, the mobile edge platform 937 may translate tokens representing UEs in the traffic rules into specific internet protocol (IP) addresses. The mobile edge platform 937 may also receive DNS records from the mobile edge platform manager 931 and configure a DNS proxy/server accordingly. The mobile edge platform 937 may host mobile edge services 937A including the mobile edge services discussed infra, and provide access to persistent storage and time of day information. Furthermore, the mobile edge platform may communicate with other mobile edge platforms via the Mp3 reference point.

Mobile edge applications (ME apps) 936 are instantiated on the virtualization infrastructure 938 of the mobile edge host 935 based on configuration or requests validated by the mobile edge management 930. ME apps 936 may run as virtual machines (VM) on top of the virtualization infrastructure 938 provided by the mobile edge host 935, and can interact with the mobile edge platform 937 to consume and provide mobile edge services 937A. In some embodiments, the ME apps 936 can also interact with the mobile edge platform 937 to perform certain support procedures related to the lifecycle of the ME apps 936, such as indicating availability, preparing relocation of user state, etc. The ME apps 936 may have a certain number of rules and requirements associated to them, such as required resources, maximum latency, required or useful services, etc. These requirements may be validated by the mobile edge system level management 930, and can be assigned to default values if missing.

A mobile edge service (ME service) 937A is a service provided and consumed either by the mobile edge platform 937 or a mobile edge application 936. When provided by an application, it can be registered in the list of services 937D to the mobile edge platform 937 over the Mp1 reference point. Additionally, the ME apps 936 can subscribe to one or more services 937A for which it is authorized over the Mp1 reference point.

As shown by FIG. 9, the Mp1 reference point is between the mobile edge platform 937 and the ME apps 936. The Mp1 reference point may provide service registration 937D, service discovery, and communication support for various services, such as the mobile edge services 937A. In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of ME services 937A may include radio network information services, location services, and bandwidth management services. Radio network information services, when available, may provide authorized ME apps 936 with radio network related information, and expose appropriate up-to-date radio network information to the ME apps 936. The radio network information may include, inter alia, radio network conditions, measurement and statistics information related to the user plane, information (e.g., UE context and radio access bearers) related to UEs served by the radio node(s) associated with the mobile edge host, changes on information related to UEs served by the radio node(s) associated with the mobile edge host, and/or the like. The radio network information may be provided at the relevant granularity (e.g., per UE, per cell, per period of time).

The location services, when available, may provide authorized ME apps with location-related information, and expose such information to the ME apps. The location information may include, inter alia, the location of specific UEs currently served by the radio node(s) associated with the mobile edge host, information about the location of all UEs currently served by the radio node(s) associated with the mobile edge host, information about the location of a certain category of UEs currently served by the radio node(s) associated with the mobile edge host, a list of UEs in a particular location, information about the location of all radio nodes currently associated with the mobile edge host, and/or the like. The location information may be in the form of a geolocation, a Global Navigation Satellite Service (GNSS) coordinate, a Cell identity (ID), and/or the like.

The bandwidth manager services may allow allocation of bandwidth to certain traffic routed to and from ME apps and the prioritization of certain traffic.

Referring back to FIG. 9, the mobile edge management comprises mobile edge system level management and the mobile edge host level management. The mobile edge host level management comprises the mobile edge platform manager 931 and the virtualization infrastructure manager 932, and handles the management of the mobile edge specific functionality of a particular mobile edge host 935 and the applications running on it.

The mobile edge platform manager 931 is responsible for the following functions: managing the life cycle of applications including informing the mobile edge orchestrator 921 of relevant application related events; providing element management functions to the mobile edge platform 937; managing the application rules and requirements including service authorizations, traffic rules, DNS configuration and resolving conflicts. The mobile edge platform manager 931 also receives virtualized resources fault reports and performance measurements from the virtualization infrastructure manager 932 for further processing.

The Mm5 reference point between the mobile edge platform manager 931 and the mobile edge platform 937 is used to perform platform configuration, configuration of the application rules and requirements, application lifecycle support procedures, management of application relocation, etc.

The virtualization infrastructure manager 932 may be an entity that allocates, manages and releases virtualized (compute, storage and networking) resources of the virtualization infrastructure 938, and prepares the virtualization infrastructure 938 to run a software image. To do so, the virtualization infrastructure manager 932 may communicate with the virtualization infrastructure 938 over the Mm7 reference point between the virtualization infrastructure manager 932 and the virtualization infrastructure 938. Preparing the virtualization infrastructure 938 may include configuring the virtualization infrastructure 938, and receiving/storing the software image. When supported, the virtualization infrastructure manager 932 may provide rapid provisioning of applications, such as described in "Openstack++ for Cloudlet Deployments", available at http://reports-archive.adm.cs.cmu.edu/anon/2015/CMU-CS-15-123.pdf.

The virtualization infrastructure manager 932 may also collect and report performance and fault information about the virtualized resources, and perform application relocation when supported. For application relocation from/to external cloud environments, the virtualization infrastructure manager 932 may interact with an external cloud manager to perform the application relocation, for example using the mechanism described in "Adaptive VM Handoff Across Cloudlets", and/or possibly through a proxy. Furthermore, the virtualization infrastructure manager 932 may communicate with the mobile edge platform manager 931 via the Mm6 reference point, which may be used to manage virtualized resources, for example, to realize the application lifecycle management. Moreover, the virtualization infrastructure manager 932 may communicate with the mobile edge orchestrator 921 via the Mm4 reference point, which may be used to manage virtualized resources of the mobile edge host 935, and to manage application images. Managing the virtualized resources may include tracking available resource capacity, etc.

The mobile edge system level management includes the mobile edge orchestrator 921 as a core component, which has an overview of the complete mobile edge system 900. The mobile edge orchestrator 921 may maintain an overall view of the mobile edge system 900 based on deployed mobile edge hosts 935, available resources, available mobile edge services 937A, and topology. The Mm3 reference point between the mobile edge orchestrator 921 and the mobile edge platform manager 930 may be used for the management of the application lifecycle, application rules and requirements and keeping track of available mobile edge services 937A. The mobile edge orchestrator 921 may communicate with the user application lifecycle management proxy 925 via the Mm9 reference point in order to manage ME apps 936 requested by UE application 905.

The mobile edge orchestrator 921 may also be responsible for on-boarding of application packages, including checking the integrity and authenticity of the packages, validating application rules and requirements and if necessary adjusting them to comply with operator policies, keeping a record of on-boarded packages, and preparing the virtualization infrastructure manager(s) 932 to handle the applications. The mobile edge orchestrator 921 may select appropriate mobile edge host(s) 935 for application instantiation based on constraints, such as latency, available resources, and available services. The mobile edge orchestrator 921 may trigger application instantiation and termination, as well as trigger application relocation as needed and when supported.

The Operations Support System (OSS) 922 refers to the OSS of an operator that receives requests via the Customer Facing Service (CFS) portal 906 (and over the Mx1 reference point) and from UE applications 905 for instantiation or termination of ME apps 936, and decides on the granting of these requests. The CFS portal 906 (and the Mx1 interface) may be used by third-parties to request the mobile edge system 900 to run applications 906 in the mobile edge system 900. Granted requests are forwarded to the mobile edge orchestrator 921 for further processing. When supported, the OSS 922 also receives requests from UE applications 905 for relocating applications between external clouds and the mobile edge system 900. The Mm2 reference point between the OSS 922 and the mobile edge platform manager 930 is used for the mobile edge platform 930 configuration, fault and performance management. The Mm reference point between the mobile edge orchestrator 921 and the OSS 922 is used for triggering the instantiation and the termination of mobile edge applications 936 in the mobile edge system 900.

The user application lifecycle management proxy ("user app LCM proxy") 925 may authorize requests from UE applications 905 in the UE and interacts with the OSS 922 and the mobile edge orchestrator 921 for further processing of these requests. The user app LCM proxy 925 may interact with the OSS 922 via the Mm8 reference point, and is used to handle UE applications 905 requests for running applications in the mobile edge system 900. A user application 905 may be an ME app 936 that is instantiated in the mobile edge system 900 in response to a request of a user via an application running in the UE (e.g., UE application 905). The user app LCM proxy 925 allows UE applications 905 to request on-boarding, instantiation, termination of user applications and when supported, relocation of user applications in and out of the mobile edge system 900. It also allows informing the UE applications 905 about the state of the user applications 905. The user app LCM proxy 925 is only accessible from within the mobile network, and may only be available when supported by the mobile edge system 900. A UE application 905 may use the Mx2 reference point between the user app LCM proxy 925 and the UE application 905 to request the mobile edge system 900 to run an application in the mobile edge system 900, or to move an application in or out of the mobile edge system 900. The Mx2 reference point may only be accessible within the mobile network and may only be available when supported by the mobile edge system.

Figure 10:
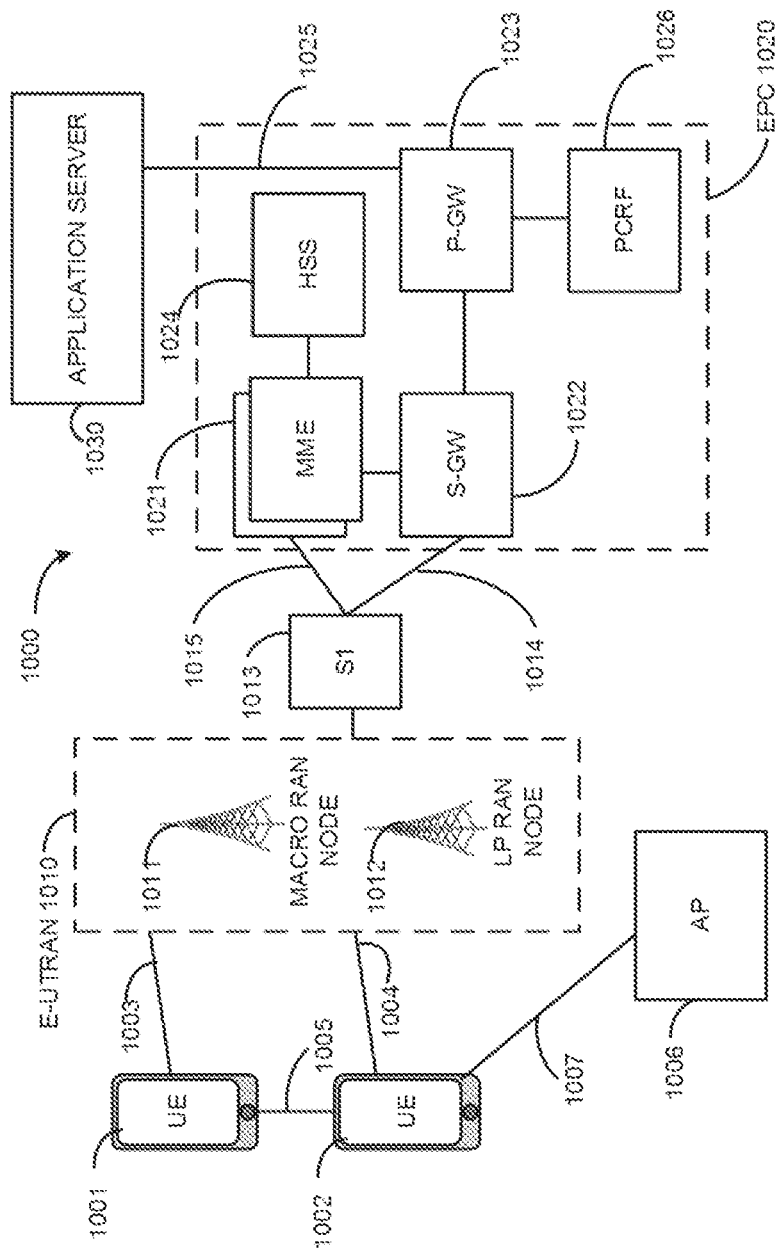
FIG. 10 illustrates an example cellular communications system architecture of a network in accordance with various embodiments.

FIG. 10 illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN). Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect. e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 1005 may be used in vehicular applications and communications technologies, which are often referred to as V2X systems. V2X is a mode of communication where UEs (for example, UEs 1001 and 1002) communicate with each other directly over the PC5/SL interface 1005 and can take place when the UEs 1001 and 1002 are served by RAN nodes 1011/1012 or when one or more UEs are outside a coverage area of the RAN 1010. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vUEs 1001/1002, RAN nodes 1011/1012, application servers, and pedestrian UEs, may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 1001 and 1002 may be implemented/employed as Vehicle Embedded Communications Systems (VECS) or VUEs.

The UE 1002 is shown to be configured to access an access point (AP) 1006 via connection 1007. The connection 1007 can comprise a local wireless connection, such as a connection consistent with any IEEE 802.11 protocol, wherein the AP 1006 would comprise a wireless fidelity (WiFi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1001 and 1002. The physical downlink control channel (PDCCH) may carry information about the transport format and resource allocations related to the PDSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 1002 within a cell) may be performed at any of the RAN nodes 1011 and 1012 based on channel quality information fed back from any of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an S1 interface 1013. In embodiments, the CN 1020 may be an evolved packet core (EPC) network, a NextGen Packet Core (NPC) network, or some other type of CN. In this embodiment the S1 interface 1013 is split into two parts: the S1-U interface 1014, which carries traffic data between the RAN nodes 1011 and 1012 and the serving gateway (S-GW) 1022, and the S1-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the S1 interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

In embodiments, the UE 1001 or the UE 1002 may be an example of the UE 101, the macro RAN node 1011, the low power (LP) RAN node 1012, and the AP 1006 may be examples of the access point 102 or the access point 103, the CN 1020 or the application server 1030 may include functions of the remote cloud 133, or the edge cloud 131, as shown in FIG. 1.

Figure 11:
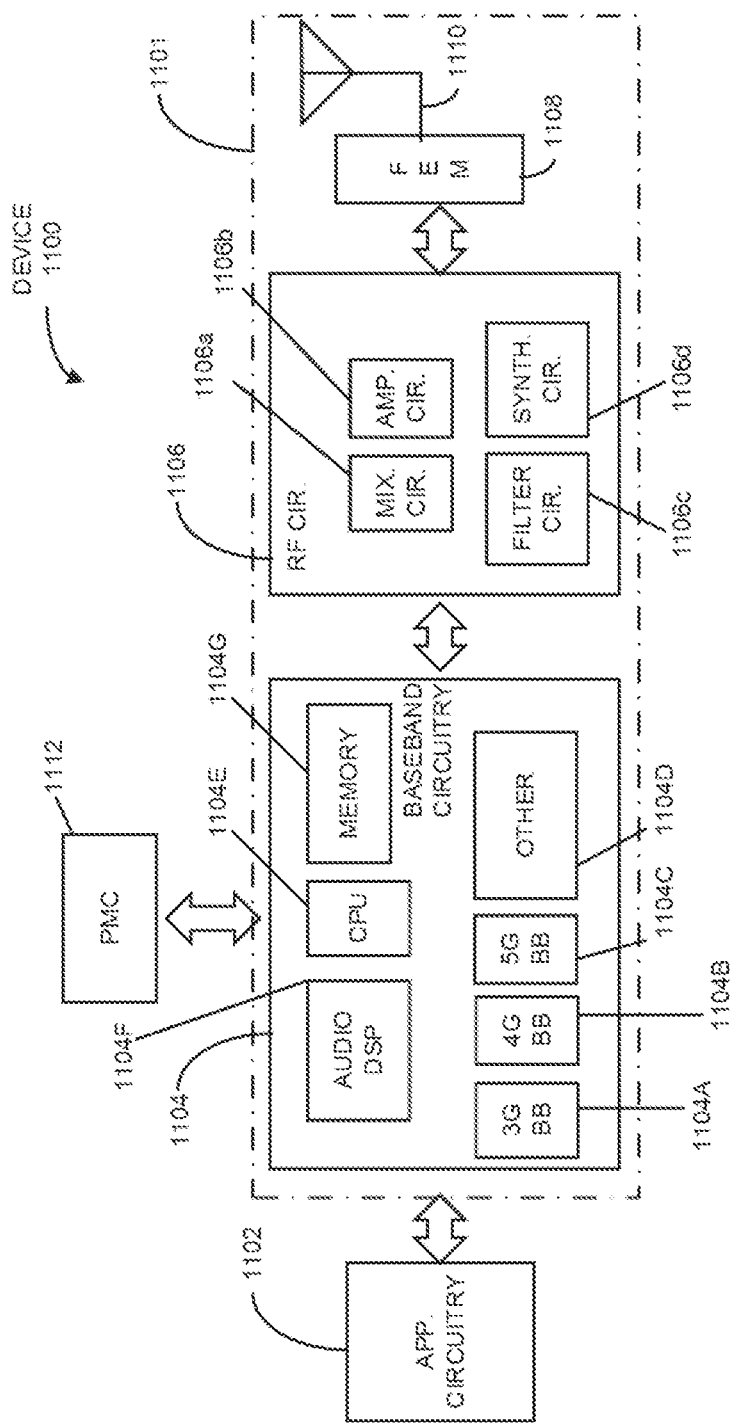
FIG. 11 illustrates an example component of an electronic device in accordance with various embodiments.

FIG. 11 illustrates example components of a device 1100 in accordance with some embodiments. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN)

implementations). In embodiments, the device 1100 may implement functions of the UE 101, the access point 102, the access point 103, the MEC host 104, the MEC host 105, and the service provider 107, as shown in FIG. 1.

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC. In some embodiments, the application circuitry 1102 may include the processor, memory, and/or storage discussed herein.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), etc.). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106a, amplifier circuitry 1106b and filter circuitry 1106c. In some embodiments, the transmit signal path of the RF circuitry 1106 may include filter circuitry 1106c and mixer circuitry 1106a. RF circuitry 1106 may also include synthesizer circuitry 1106d for synthesizing a frequency for use by the mixer circuitry 1106a of the receive signal path and the transmit signal path. In some embodiments, the mixer circuitry 1106a of the receive signal path may be configured to down-convert RF signals received from the FEM circuitry 1108 based on the synthesized frequency provided by synthesizer circuitry 1106d. The amplifier circuitry 1106b may be configured to amplify the down-converted signals and the filter circuitry 1106c may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106a of the receive signal path may comprise passive mixers, although the scope of the embodiments is not limited in this respect.

In some embodiments, the mixer circuitry 1106a of the transmit signal path may be configured to up-convert input baseband signals based on the synthesized frequency provided by the synthesizer circuitry 1106d to generate RF output signals for the FEM circuitry 1108. The baseband signals may be provided by the baseband circuitry 1104 and may be filtered by filter circuitry 1106c.

In some embodiments, the mixer circuitry 1106a of the receive signal path and the mixer circuitry 1106a of the transmit signal path may include two or more mixers and may be arranged for quadrature downconversion and upconversion, respectively. In some embodiments, the mixer circuitry 1106a of the receive signal path and the mixer circuitry 1106a of the transmit signal path may include two or more mixers and may be arranged for image rejection (e.g., Hartley image rejection). In some embodiments, the mixer circuitry 1106a of the receive signal path and the mixer circuitry 1106a may be arranged for direct downconversion and direct upconversion, respectively. In some embodiments, the mixer circuitry 1106a of the receive signal path and the mixer circuitry 1106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106d may be a fractional-N synthesizer or a fractional N/N+1 synthesizer, although the scope of the embodiments is not limited in this respect as other types of frequency synthesizers may be suitable. For example, synthesizer circuitry 1106d may be a delta-sigma synthesizer, a frequency multiplier, or a synthesizer comprising a phase-locked loop with a frequency divider.

The synthesizer circuitry 1106d may be configured to synthesize an output frequency for use by the mixer circuitry 1106a of the RF circuitry 1106 based on a frequency input and a divider control input. In some embodiments, the synthesizer circuitry 1106d may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106d of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics. In some embodiments, the PMC 1112 may be part of the battery monitor/charger.

While FIG. 11 shows the PMC 1112 coupled only with the baseband circuitry 1104. However, in other embodiments, the PMC 1112 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein. Layer 3 may comprise a radio resource control (RRC) layer, described in further detail below. As referred to herein. Layer 2 may comprise a medium access control (MAC) layer, a radio link control (RLC) layer, and a packet data convergence protocol (PDCP) layer, described in further detail below. As referred to herein. Layer 1 may comprise a physical (PHY) layer of a UE/RAN node, described in further detail below.

The baseband circuitry 1104 may further include one or more interfaces to communicatively couple to other circuitries/devices, such as a memory interface (e.g., an interface to send/receive data to/from memory external to the baseband circuitry 1104), an application circuitry interface (e.g., an interface to send/receive data to/from the application circuitry 1102 of FIG. 11), an RF circuitry interface (e.g., an interface to send/receive data to/from RF circuitry 1106 of FIG. 11), a wireless hardware connectivity interface (e.g., an interface to send/receive data to/from Near Field Communication (NFC) components. Bluetooth® components (e.g., Bluetooth® Low Energy), Wi-Fi® components, and other communication components), and a power management interface (e.g., an interface to send/receive power or control signals to/from the PMC 1112.

Figure 12:
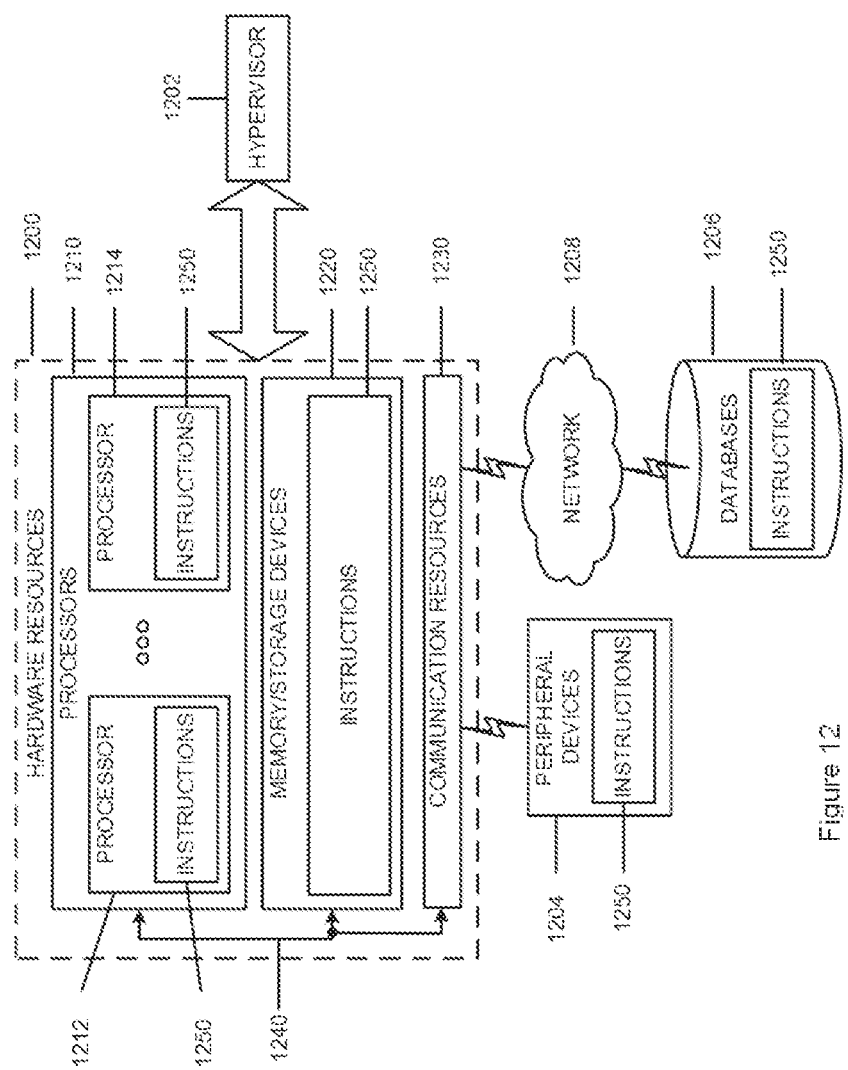
FIG. 12 illustrates an example block diagram including components able to read instructions from a machine-readable or computer-readable medium (e.g., a non-transitory machine-readable storage medium) and perform any one or more of the methodologies discussed herein, in accordance with various embodiments.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically. FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200. In embodiments, the hardware resources 1200 may implement functions of the UE 101, the access point 102, the access point 103, the MEC host 104, the MEC host 105, and the service provider 107, as shown in FIG. 1.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy). Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Example 1 may include an apparatus for multi-access edge computing (MEC), comprising: a communication interface to receive, from a user equipment (UE), a request for a service to be provided to the UE; a local cost measurements module coupled to the communication interface to collect a set of local cost measurements for the service, wherein the set of local cost measurements includes one or more local cost measurements from a first entity to a second entity along a path from the UE to a service provider to provide the service to the UE; and a service allocation module coupled to the communication interface and the local cost measurements module to determine to allocate the service to a MEC host based on an allocation policy related to a cost for the MEC host to provide the service or a cost for the service provider to provide the service in view of the one or more local cost measurements.

Example 2 may include the apparatus of example 1 and/or some other examples herein, wherein a local cost measurement of the one or more local cost measurements from the first entity to the second entity represents a latency from the first entity to the second entity.

Example 3 may include the apparatus of any one of examples 1-2 and/or some other examples herein, wherein the set of local cost measurements for the service includes one or more local cost measurements from the UE to one or more access points, from the one or more access points to one or more MEC hosts, or from the one or more MEC hosts to the service provider.

Example 4 may include the apparatus of any one of examples 1-2 and/or some other examples herein, wherein the set of local cost measurements for the service includes one or more local cost measurements from historical data.

Example 5 may include the apparatus of any one of examples 1-2 and/or some other examples herein, wherein to collect the set of local cost measurements for the service, the local cost measurements module is to send one or more local cost measurement requests to an end-to-end (E2E) service module in a MEC platform manager or the UE, and to receive one or more reports including the set of local cost measurements for the service from the E2E service module or the UE.

Example 6 may include the apparatus of any one of examples 1-2 and/or some other examples herein, wherein the cost for the MEC host to provide the service or the cost for the service provider to provide the service is indicated by a cost graph constructed based on the set of local cost measurements for the service.

Example 7 may include the apparatus of example 6 and/or some other examples herein, wherein the service allocation module is to construct the cost graph based on the set of local cost measurements for the service.

Example 8 may include the apparatus of example 6 and/or some other examples herein, wherein the cost graph is constructed based on the set of local cost measurements for the service, the cost graph includes one or more nodes corresponding to the UE, the service provider, one or more access points, and one or more MEC hosts, and an edge between two nodes of the cost graph corresponding to a local cost measurement between the two nodes.

Example 9 may include the apparatus of example 6 and/or some other examples herein, wherein the cost graph is updated when an additional MEC host is available to provide the service or a MEC host is no longer available to provide the service.

Example 10 may include the apparatus of any one of examples 1-2 and/or some other examples herein, wherein the first entity along the path from the UE to the service provider includes an access point to provide access to the service for the UE in long term evolution (LTE) technology, wireless local area network (WLAN), or new radio (NR) technology.

Example 11 may include the apparatus of any one of examples 1-2 and/or some other examples herein, wherein the allocation policy is to allocate the service to the MEC host when a difference between the cost for the service provider to provide the service and the cost for the MEC host to provide the service is larger than or equal to a predetermined threshold.

Example 12 may include the apparatus of any one of examples 1-2 and/or some other examples herein, wherein the service allocation module is to determine based on the allocation policy to keep the service at the service provider or a MEC host when the UE is handed over from a first access point in a first cell to a second access point in a second cell.

Example 13 may include the apparatus of any one of examples 1-2 and/or some other examples herein, wherein the communication interface is to receive, from multiple UEs, multiple requests for multiple services, the local cost measurements module is to collect multiple sets of local cost measurements for the multiple services, and the service allocation module is to determine, based on the multiple sets of local cost measurements and the allocation policy, to allocate a service of the multiple services to a MEC host.

Example 14 may include the apparatus of any one of examples 1-2 and/or some other examples herein, wherein the communication interface is to receive, from multiple UEs, multiple requests for multiple services including a first service and a second service, the local cost measurements module is to collect multiple sets of local cost measurements for the multiple services, and the service allocation module is to determine, based on the multiple sets of local cost measurements and the allocation policy for the multiple services, to allocate the first service to a first MEC host, and to allocated the second service to a second MEC host.

Example 15 may include an apparatus for multi-access edge computing (MEC), comprising: a communication interface to send one or more requests to one or more entities to report a local cost measurement for providing a service to a user equipment (UE) by a service provider, wherein the one or more entities include the UE, one or more access points, one or more MEC hosts, or the service provider, which are along a path from the UE to the service provider; an end-to-end (E2E) service module coupled to the communication interface to collect the set of local cost measurements for the service to the UE, wherein the set of local cost measurements includes one or more local cost measurements from the one or more entities.

Example 16 may include the apparatus of example 15 and/or some other examples herein, wherein the communication interface is to receive a request to collect the set of local cost measurements for providing the service to the UE, before sending the one or more requests to the one or more entities.

Example 17 may include the apparatus of any one of examples 15-16 and/or some other examples herein, wherein the E2E service module is further to construct a cost graph based on the set of local cost measurements for the service, wherein the cost graph includes one or more nodes corresponding to the UE, the service provider, the one or more access points, and the one or more MEC hosts, and an edge between two nodes of the cost graph corresponding to a local cost measurement between the two nodes.

Example 18 may include the apparatus of example 17 and/or some other examples herein, wherein the E2E service module is further to send to a MEC orchestrator a report including the set of local cost measurements for the service, or the cost graph based on the set of local cost measurements for the service.

Example 19 may include the apparatus of example 18 and/or some other examples herein, wherein the E2E service module is to send the cost graph in a tag-length-value format including one or more tags, and the one or more tags include a tag for a graph, a tag for a node, a tag for an edge, or a tag for a local cost measurement.

Example 20 may include the apparatus of example 17 and/or some other examples herein, wherein the cost graph is updated when an additional MEC host is available to provide the service or a MEC host is no longer available to provide the service.

Example 21 may include the apparatus of any one of examples 15-16 and/or some other examples herein, wherein the communication interface is to send the one or more requests to the one or more entities to report the one or more local cost measurements for providing multiple services to one or more UEs; and the E2E service module is to collect multiple sets of local cost measurements for the multiple services for the one or more UEs.

Example 22 may include a method for providing a multi-access edge computing (MEC) service, comprising: receiving, a request for providing a service to a user equipment (UE) by a service provider; collecting a set of local cost measurements for the service, wherein the set of local cost measurements includes one or more local cost measurements from a first entity to a second entity along a path from the UE to the service provider to provide the service to the UE; and determining to allocate the service to a MEC host based on an allocation policy related to a cost for the MEC host to provide the service or a cost for the service provider to provide the service in view of the one or more local cost measurements.

Example 23 may include the method of example 22 and/or some other examples herein, wherein the set of local cost measurements includes one or more local cost measurements from the UE to one or more access points, from the one or more access points to one or more MEC hosts, and from the one or more MEC hosts to the service provider.

Example 24 may include the method of any one of examples 22-23 and/or some other examples herein, wherein the cost for the MEC host to provide the service or the cost for the service provider to provide the service is indicated by a cost graph constructed based on the set of local cost measurements for the service.

Example 25 may include the method of any one of examples 22-23 and/or some other examples herein, wherein the allocation policy is to allocate the service to the MEC host when a difference between the cost for the service provider to provide the service and the cost for the MEC host to provide the service is larger than or equal to a predetermined threshold.

Example 26 may include one or more computer-readable media having instructions for providing a multi-access edge computing (MEC) service, upon execution of the instructions by one or more processors, to perform the method of any one of examples 22-25.

Example 27 may include an apparatus for providing a multi-access edge computing (MEC) service, comprising: means for receiving, a request for providing a service to a user equipment (UE) by a service provider; means for collecting a set of local cost measurements for the service, wherein the set of local cost measurements includes one or more local cost measurements from a first entity to a second entity along a path from the UE to the service provider to provide the service to the UE; and means for determining to allocate the service to a MEC host based on an allocation policy related to a cost for the MEC host to provide the service or a cost for the service provider to provide the service in view of the one or more local cost measurements.

Example 28 may include the apparatus of example 27 and/or some other examples herein, wherein the set of local cost measurements includes one or more local cost measurements from the UE to one or more access points, from the one or more access points to one or more MEC hosts, and from the one or more MEC hosts to the service provider.

Example 29 may include the apparatus of any one of examples 27-28 and/or some other examples herein, wherein the cost for the MEC host to provide the service or the cost for the service provider to provide the service is indicated by a cost graph constructed based on the set of local cost measurements for the service.

Example 30 may include the apparatus of any one of examples 27-28 and/or some other examples herein, wherein the allocation policy is to allocate the service to the MEC host when a difference between the cost for the service provider to provide the service and the cost for the MEC host to provide the service is larger than or equal to a predetermined threshold.

Example 31 may include the apparatus of any one of examples 1-2 and/or some other examples herein, wherein the communication interface includes a processor and a memory device.

Example 32 may include the apparatus of any one of examples 15-16 and/or some other examples herein, wherein the communication interface includes a processor and a memory device.

Example 33 may include an apparatus for multi-access edge computing (MEC), comprising: a processor, a memory device coupled to the processor; a communication interface to be loaded into the memory device and executed by the processor to receive, from a user equipment (UE), a request for a service to be provided to the UE; a local cost measurements module coupled to the processor and the memory device to collect a set of local cost measurements for the service, wherein the set of local cost measurements includes one or more local cost measurements from a first entity to a second entity along a path from the UE to a service provider to provide the service to the UE; and a service allocation module coupled to the local cost measurements module to determine to allocate the service to a MEC host based on an allocation policy related to a cost for the MEC host to provide the service or a cost for the service provider to provide the service in view of the one or more local cost measurements.

Example 34 may include the apparatus of example 33 and/or some other examples herein, wherein a local cost measurement of the one or more local cost measurements from the first entity to the second entity represents a latency from the first entity to the second entity.

Example 35 may include the apparatus of any one of examples 33-34 and/or some other examples herein, wherein the set of local cost measurements for the service includes one or more local cost measurements from the UE to one or more access points, from the one or more access points to one or more MEC hosts, or from the one or more MEC hosts to the service provider.

Example 36 may include the apparatus of any one of examples 33-34 and/or some other examples herein, wherein the set of local cost measurements for the service includes one or more local cost measurements from historical data.

Example 37 may include the apparatus of any one of examples 33-34 and/or some other examples herein, wherein to collect the set of local cost measurements for the service, the local cost measurements module is to send one or more local cost measurement requests to an end-to-end (E2E) service module in a MEC platform manager or the UE, and to receive one or more reports including the set of local cost measurements for the service from the E2E service module or the UE.

Example 38 may include the apparatus of any one of examples 33-34 and/or some other examples herein, wherein the cost for the MEC host to provide the service or the cost for the service provider to provide the service is indicated by a cost graph constructed based on the set of local cost measurements for the service.

Example 39 may include the apparatus of example 38 and/or some other examples herein, wherein the service allocation module is to construct the cost graph based on the set of local cost measurements for the service.

Example 40 may include the apparatus of example 38 and/or some other examples herein, wherein the cost graph is constructed based on the set of local cost measurements for the service, the cost graph includes one or more nodes corresponding to the UE, the service provider, one or more access points, and one or more MEC hosts, and an edge between two nodes of the cost graph corresponding to a local cost measurement between the two nodes.

Example 41 may include the apparatus of example 38 and/or some other examples herein, wherein the cost graph is updated when an additional MEC host is available to provide the service or a MEC host is no longer available to provide the service.

Example 42 may include an apparatus for multi-access edge computing (MEC), comprising: a processor, a memory device coupled to the processor; a communication interface to be loaded into the memory device and executed by the processor to send one or more requests to one or more entities to report a local cost measurement for providing a service to a user equipment (UE) by a service provider, wherein the one or more entities include the UE, one or more access points, one or more MEC hosts, or the service provider, which are along a path from the UE to the service provider; and an end-to-end (E2E) service module coupled to the processor and the memory device to collect the set of local cost measurements for the service to the UE, wherein the set of local cost measurements includes one or more local cost measurements from the one or more entities.

Example 43 may include the apparatus of example 42 and/or some other examples herein, wherein the communication interface is to receive a request to collect the set of local cost measurements for providing the service to the UE, before sending the one or more requests to the one or more entities.

Example 44 may include the apparatus of any one of examples 42-43 and/or some other examples herein, wherein the E2E service module is further to construct a cost graph based on the set of local cost measurements for the service, wherein the cost graph includes one or more nodes corresponding to the UE, the service provider, the one or more access points, and the one or more MEC hosts, and an edge between two nodes of the cost graph corresponding to a local cost measurement between the two nodes.

Example 45 may include the apparatus of example 44 and/or some other examples herein, wherein the E2E service module is further to send to a MEC orchestrator a report including the set of local cost measurements for the service, or the cost graph based on the set of local cost measurements for the service.

Example 46 may include the apparatus of example 45 and/or some other examples herein, wherein the E2E service module is to send the cost graph in a tag-length-value format including one or more tags, and the one or more tags include a tag for a graph, a tag for a node, a tag for an edge, or a tag for a local cost measurement.

Example 47 may include the apparatus of example 44 and/or some other examples herein, wherein the cost graph is updated when an additional MEC host is available to provide the service or a MEC host is no longer available to provide the service.

Example 48 may include the apparatus of any one of examples 42-43 and/or some other examples herein, wherein the communication interface is to send the one or more requests to the one or more entities to report the one or more local cost measurements for providing multiple services to one or more UEs; and the E2E service module is to collect multiple sets of local cost measurements for the multiple services for the one or more UEs.

Example 49 may include an apparatus comprising: means for receiving a service request from a user equipment (UE); means for providing a list of possible host to the UE for the service; means for requesting system wide measurements of latency; means for assembling a latency graph; means for allocating one or more hosts for the service; and means for reporting back to the UE the allocated one or more hosts.

Example 50 may include an apparatus comprising means to perform one or more elements of a method described in or related to any of examples 1-49, or any other method or process described herein.

Example 51 may include one or more non-transitory computer-readable media comprising instructions to cause an electronic device, upon execution of the instructions by one or more processors of the electronic device, to perform one or more elements of a method described in or related to any of examples 1-49, or any other method or process described herein.

Example 52 may include an apparatus comprising logic, modules, or circuitry to perform one or more elements of a method described in or related to any of examples 1-49, or any other method or process described herein.

Example 53 may include a method, technique, or process as described in or related to any of examples 1-49, or portions or parts thereof.

Example 54 may include an apparatus comprising: one or more processors and one or more computer readable media comprising instructions that, when executed by the one or more processors, cause the one or more processors to perform the method, techniques, or process as described in or related to any of examples 1-49, or portions thereof.

Example 55 may include a signal as described in or related to any of examples 1-49, or portions or parts thereof.

Example 56 may include a signal in a wireless network as shown and described herein.

Example 57 may include a method of communicating in a wireless network as shown and described herein.

Example 58 may include a system for providing wireless communication as shown and described herein.

Example 59 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A method of coordinating services in an edge computing system, the method comprising:
   causing a request to be transmitted to at least one network entity to report a cost measurement for providing a service, the service provided in the edge computing system from a service provider to a user equipment (UE), wherein the at least one network entity is provided from among: the UE, an access point along a path from the UE to the service provider, a service host along the path from the UE to the service provider, or the service provider;
   identifying the cost measurement from a response to the request, wherein the response to the request includes at least one cost measurement provided from the at least one network entity;
   determining a change to the service with the at least one network entity, based on the at least one cost measurement; and
   causing the change to the service to be implemented in the edge computing system.

2. The method of claim 1, wherein the edge computing system provides an application server to provide at least one interface associated with the service.

3. The method of claim 2, wherein the request is provided in response to another request for use of the service received via the at least one interface associated with the service.

4. The method of claim 2, further comprising:
   processing a request to collect the cost measurement for providing the service to the UE, before transmitting the request to the at least one network entity, and wherein the cost measurement relates to a cost measured by: a financial metric, a latency metric, or a quality of service metric.

5. The method of claim 1, further comprising:
constructing a cost graph based on the cost measurement for providing the service, wherein the cost graph includes nodes corresponding to network entities and an edge between two nodes of the cost graph corresponding to a local cost measurement between the two nodes.

6. The method of claim 5, further comprising:
generating a report of the cost measurement for the service; and
causing the report to be transmitted to an orchestrator of the edge computing system.

7. The method of claim 5, wherein the cost graph is updated when an additional service host is available to provide the service or a service host is no longer available to provide the service.

8. The method of claim 1, further comprising:
causing another request to be transmitted to the at least one network entity to report local cost measurements for providing multiple services to at least one UE; and
collecting multiple sets of local cost measurements for the multiple services in response to the another request.

9. At least one non-transitory machine-readable storage medium comprising instructions stored thereupon, which when executed by processing circuitry of a computing system, cause the processing circuitry to perform operations in an edge computing system that:
cause a request to be transmitted to at least one network entity to report a cost measurement for providing a service, the service provided in the edge computing system from a service provider to a user equipment (UE), wherein the at least one network entity is provided from among: the UE, an access point along a path from the UE to the service provider, a service host along the path from the UE to the service provider, or the service provider;
identify the cost measurement from a response to the request, wherein the response to the request includes at least one cost measurement provided from the at least one network entity;
determine a change to the service with the at least one network entity, based on the at least one cost measurement; and
cause the change to the service to be implemented in the edge computing system.

10. The machine-readable storage medium of claim 9, wherein the computing system provides an application server used in the edge computing system, the application server to provide at least one interface associated with the service.

11. The machine-readable storage medium of claim 10, wherein the request is provided in response to another request for use of the service received via the at least one interface associated with the service.

12. The machine-readable storage medium of claim 10, the instructions further to cause the processing circuitry to perform operations that:
process a request to collect the cost measurement for providing the service to the UE, before transmitting the request to the at least one network entity, and wherein the cost measurement relates to a cost measured by: a financial metric, a latency metric, or a quality of service metric.

13. The machine-readable storage medium of claim 9, the instructions further to cause the processing circuitry to perform operations that:
construct a cost graph based on the cost measurement for providing the service, wherein the cost graph includes nodes corresponding to network entities and an edge between two nodes of the cost graph corresponding to a local cost measurement between the two nodes.

14. The machine-readable storage medium of claim 13, the instructions further to cause the processing circuitry to perform operations that:
generate a report of the cost measurement for the service; and
cause the report to be transmitted to an orchestrator.

15. The machine-readable storage medium of claim 13, wherein the cost graph is updated when an additional service host is available to provide the service or a service host is no longer available to provide the service.

16. The machine-readable storage medium of claim 9, the instructions further to cause the processing circuitry to perform operations that:
cause another request to be transmitted to the at least one network entity to report local cost measurements for providing multiple services to at least one UE; and
collect multiple sets of local cost measurements for the multiple services in response to the another request.

* * * * *